United States Patent
Takahashi et al.

(10) Patent No.: US 11,174,993 B2
(45) Date of Patent: Nov. 16, 2021

(54) HYDROGEN STATION AND OPERATING METHOD FOR HYDROGEN STATION

(71) Applicant: SAMTECH CORPORATION, Kashiwara (JP)

(72) Inventors: Kazuya Takahashi, Kashiwara (JP); Ryosuke Uchimoto, Kashiwara (JP)

(73) Assignee: SAMTECH CORPORATION, Kashiwara (JP)

( * ) Notice: Subject to any disclaimer, the term of this patent is extended or adjusted under 35 U.S.C. 154(b) by 0 days.

(21) Appl. No.: 17/050,822

(22) PCT Filed: Oct. 29, 2019

(86) PCT No.: PCT/JP2019/042424
§ 371 (c)(1),
(2) Date: Oct. 26, 2020

(87) PCT Pub. No.: WO2020/137139
PCT Pub. Date: Jul. 2, 2020

(65) Prior Publication Data
US 2021/0231264 A1    Jul. 29, 2021

(30) Foreign Application Priority Data
Dec. 25, 2018 (JP) .............................. JP2018-240907

(51) Int. Cl.
*F17C 5/06* (2006.01)
*F17C 5/00* (2006.01)

(52) U.S. Cl.
CPC ................ *F17C 5/06* (2013.01); *F17C 5/007* (2013.01); *F17C 2205/0138* (2013.01);
(Continued)

(58) Field of Classification Search
CPC .... F17C 5/06; F17C 5/007; F17C 2227/0157; F17C 2205/0138; F17C 2221/012;
(Continued)

(56) References Cited

U.S. PATENT DOCUMENTS 5,406,988 A * 4/1995 Hopkins .................... F17C 7/00
                                                        123/527
8,291,944 B2 * 10/2012 Allidieres ................. F17C 9/00
                                                        141/60
(Continued)

FOREIGN PATENT DOCUMENTS

JP   H08-109999 A    4/1996
JP   2010-534308 A   11/2010
(Continued)

*Primary Examiner* — Timothy L Maust
*Assistant Examiner* — James R Hakomaki
(74) *Attorney, Agent, or Firm* — Maschoff Brennan

(57) ABSTRACT

When a pressure accumulator tank A3a is used as a low-pressure bank, a controller sends an open control signal to an electromagnetic open/close valve A10a to open the electromagnetic open/close valve A10a so that hydrogen in the pressure accumulator tank A3a can be supplied to a tank to be filled (not shown) of an FCV. In parallel with this, the controller sends an open control signal to a first electromagnetic open/close valve 6a and a second electromagnetic open/close valve 6b to open the first and second electromagnetic open/close valves 6a and 6b so that hydrogen can be supplied also from a compressor 2 to the tank to be filled of the FCV.

8 Claims, 10 Drawing Sheets

(52) U.S. Cl.
CPC .............. *F17C 2221/012* (2013.01); *F17C 2227/0157* (2013.01); *F17C 2250/032* (2013.01); *F17C 2265/061* (2013.01); *F17C 2270/0168* (2013.01); *F17C 2270/0184* (2013.01)

(58) Field of Classification Search
CPC ........ F17C 2265/061; F17C 2270/0184; F17C 2270/0168; F17C 2250/032
USPC .......................................................... 141/4
See application file for complete search history.

(56) References Cited

U.S. PATENT DOCUMENTS

| | | | | |
|---|---|---|---|---|
| 9,464,761 | B2* | 10/2016 | Nagura | F17C 13/025 |
| 10,145,512 | B2* | 12/2018 | Barker | F17C 5/06 |
| 2010/0193070 | A1 | 8/2010 | Allidieres | |
| 2012/0216910 | A1* | 8/2012 | Inagi | F17C 5/06 |
| | | | | 141/4 |
| 2012/0267002 | A1* | 10/2012 | Kittilsen | F17C 5/06 |
| | | | | 141/4 |
| 2012/0318403 | A1 | 12/2012 | Cohen et al. | |
| 2015/0167895 | A1* | 6/2015 | Nagura | F17C 13/025 |
| | | | | 141/4 |
| 2015/0308622 | A1* | 10/2015 | Koonce | F17C 5/06 |
| | | | | 141/4 |
| 2016/0146400 | A1* | 5/2016 | Allidieres | F17C 5/06 |
| | | | | 141/4 |
| 2017/0023180 | A1* | 1/2017 | Petit | F17C 7/00 |
| 2017/0051875 | A1* | 2/2017 | Nagura | F17C 5/06 |
| 2017/0059089 | A1* | 3/2017 | Uchida | F17C 13/026 |
| 2017/0130901 | A1* | 5/2017 | Sloan | F17C 5/06 |
| 2018/0023764 | A1 | 1/2018 | Okuno et al. | |
| 2018/0038550 | A1* | 2/2018 | Kondo | F17C 5/06 |
| 2018/0313496 | A1* | 11/2018 | Garner | F04B 23/02 |

FOREIGN PATENT DOCUMENTS

| | | |
|---|---|---|
| JP | 2013-002635 A | 1/2013 |
| JP | 2016-084902 A | 5/2016 |
| JP | 2016-153656 A | 8/2016 |
| JP | 2018-151043 A | 9/2018 |

* cited by examiner

FIG.10
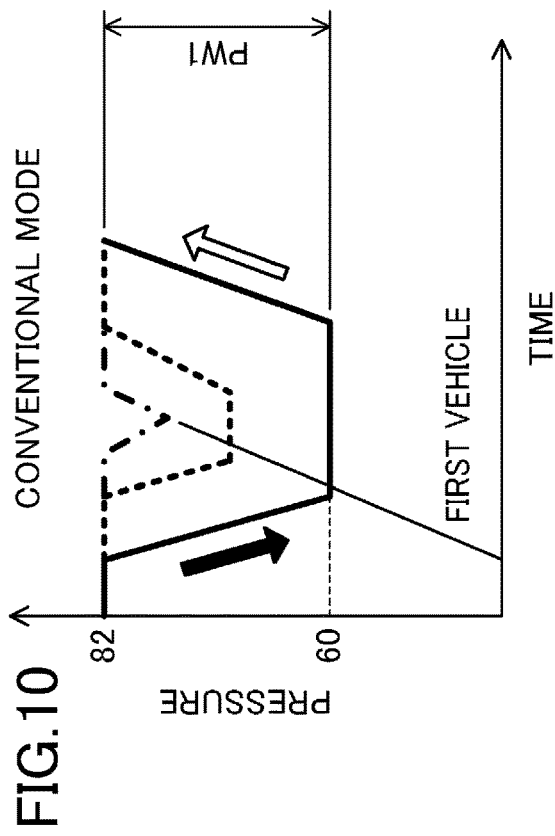
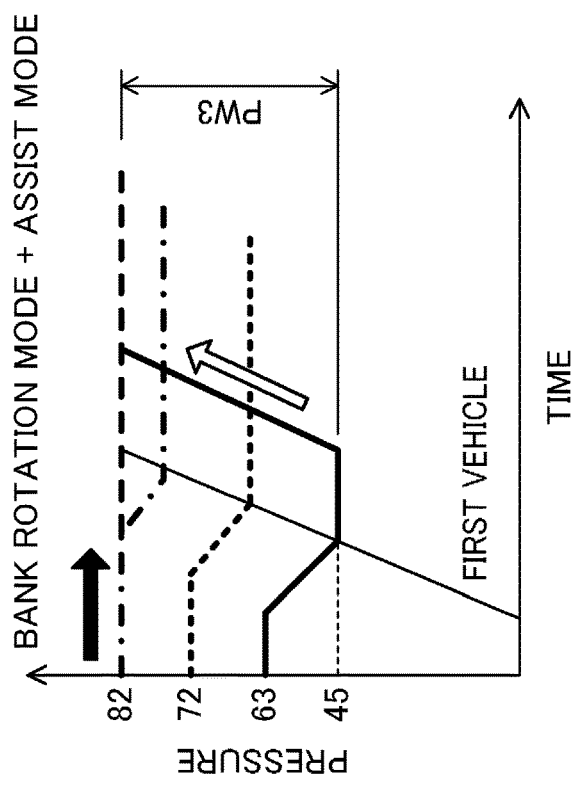
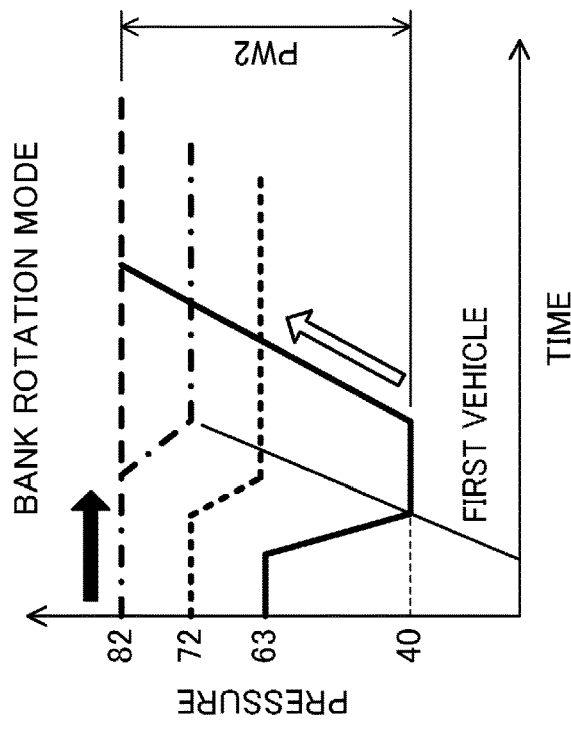

HYDROGEN STATION AND OPERATING METHOD FOR HYDROGEN STATION

TECHNICAL FIELD

The present invention relates to a hydrogen station that supplies hydrogen to a target to be filled, such as a fuel cell vehicle, and a method for operating the hydrogen station.

BACKGROUND ART

A conventional hydrogen station that supplies hydrogen to a target to be filled, such as a fuel cell vehicle, includes, for example, a booster unit that boosts hydrogen, a pressure accumulator unit that accumulates the boosted hydrogen, and a supply unit that supplies the hydrogen accumulated in the pressure accumulator unit to the target to be filled.

In order to spread the use of such a hydrogen station, a maintenance cost of the hydrogen station needs to be reduced. Most of the maintenance cost is a cost for replacement of pressure accumulator tanks, which are pressure accumulators used as the pressure accumulator unit that accumulates hydrogen. Therefore, a frequency of replacement of the pressure accumulator tanks needs to be reduced as much as possible.

In view of durability, the pressure accumulator tank has an upper limit value set for the total number of allowable pressure accumulation cycles. The pressure accumulator tank needs to be replaced before the total number of pressure accumulation cycles exceeds the upper limit value. For this reason, the issue is how to reduce the total number of the pressure accumulation cycles in order to lower the replacement frequency.

To address this problem, Patent Document 1 described below proposes a technique for operating a hydrogen station in an operation mode which is generally called a "bank rotation" mode, in which a plurality of pressure accumulator tanks is prepared and their ranges of pressure change during supply are varied. For example, four pressure accumulator tanks each serving four functions as a low-pressure bank, a medium-pressure bank, a high-pressure bank, and a pressure recovery (/standby) bank, are prepared, and these banks change the functions in rotation for every supply.

If the hydrogen station is operated in the "bank rotation" mode as described in Patent Document 1, each of the four pressure accumulator tanks having the four functions, for example, performs accumulation (pressure recovery) only once every four supplies. This can reduce the total number of pressure accumulation cycles to a quarter of that in the case where every pressure accumulator tank performs the accumulation at every supply. Thus, the operation in the "bank rotation" mode can reduce the cost of replacement of the pressure accumulator tanks, and can reduce the maintenance cost of the hydrogen station.

CITATION LIST

Patent Document

Patent Document 1: Japanese Unexamined Patent Publication No. 2016-84902

SUMMARY OF THE INVENTION

Technical Problem

When the hydrogen station is operated in the "bank rotation" mode, the supply of hydrogen to a tank of a target to be filled, such as a fuel cell vehicle (the tank will be hereinafter referred to as a "tank to be filled"), generally starts from one of the pressure accumulator tanks serving as the low-pressure bank. This supply of hydrogen is performed by so-called "differential pressure."

The supply by the "differential pressure" refers to a method in which hydrogen is supplied by using the pressure difference between the pressure accumulator tank and the tank to be filled, and the hydrogen supply ends when the pressure of the pressure accumulator tank and the pressure of the tank to be filled balance with each other.

For example, suppose that the pressure accumulator tank and the tank to be filled have the same capacities, and the pressure of the pressure accumulator tank is 100 MPa and the pressure of the tank to be filled is 0 MPa before the filling, the pressure accumulator tank and the tank to be filled balance with each other at around 50 MPa, and the supply (filling) of hydrogen ends. If the pressure of the pressure accumulator tank is 60 MPa and the pressure of the tank to be filled is 0 MPa, the pressure accumulator tank and the tank to be filled balance with each other at around 30 MPa, and the supply (filling) of hydrogen ends. This method of supplying hydrogen by using the pressure difference is the filling by "differential pressure."

When hydrogen is supplied by using the differential pressure, the lower the pressure value of the pressure accumulator tank before the filling is, the lower the pressure value at which the tank pressures balance with each other and the hydrogen filling ends becomes, as described above.

Thus, when the hydrogen station is operated in the "bank rotation" mode using the differential pressure, another problem arises. In the "bank rotation" mode, the pressure accumulator tank serving as the low-pressure bank has a lower pressure value than the normal pressure accumulator tank. Thus, the problem is that the pressure value after the end of the filling becomes lower than the pressure value of the normal pressure accumulator tank.

As described above, when the pressure value of the pressure accumulator tank serving as the low-pressure bank is lowered at the end of filling, and then hydrogen is boosted and accumulated in the same pressure accumulator tank so that the pressure accumulator tank serves as the recovery bank, a difference between the lowered pressure and a pressure value to which the pressure is recovered (maximum pressure value) increases, i.e., a "pressure fluctuation width (pressure amplitude)" becomes larger than before. This causes another problem, that is, the number of repetitions in a generally called S-N diagram (stress-endurance diagram) of the pressure accumulator tank decreases.

Specifically, although the total number of pressure accumulation cycles is reduced in the "bank rotation" mode, the "pressure fluctuation width (pressure amplitude)" increases as compared to that in a conventional mode. This consequently imposes a large burden on the pressure accumulator tank, and reduces the number of repetitions in the S-N diagram of the pressure accumulator tank. Thus, the goal of reducing the replacement frequency of the pressure accumulator tank operated in the bank rotation mode cannot be achieved to a sufficient degree.

In practice, when designing the pressure accumulator tank, as long as an actual pressure fluctuation width falls within the pressure fluctuation width (pressure amplitude) taken as a design premise, it is not necessary to change the replacement frequency of the pressure accumulator tank even if the pressure fluctuation width (pressure amplitude) is large. However, in the "bank rotation" mode, the pressure fluctuation width (pressure amplitude) of the pressure accumulator tank becomes considerably large as described above, and may possibly exceed the pressure fluctuation width taken as the design premise. If the pressure fluctuation width taken as the design premise becomes large, problems arise, e.g., the replacement frequency of the pressure accumulator tank needs to increase, and an expensive pressure accumulator tank improved in fatigue performance needs to be prepared.

The present invention has been made in view of the above problems, and an object of the present invention is to provide a hydrogen station that is operated in a so-called bank rotation mode, and a method for operating the hydrogen station. Specifically, the present invention provides a hydrogen station that can reliably achieve the goal of reducing the replacement frequency of the pressure accumulator tank by keeping a pressure value at which the filling of the pressure accumulator tank serving as a low-pressure bank ends from decreasing, and a method for operating the hydrogen station.

Solution to the Problem

In order to achieve the object, according to the present invention related to the hydrogen station operated in the so-called bank rotation mode and the method for operating the hydrogen station, hydrogen is supplied not only from the pressure accumulator tank operated in the bank rotation mode, but simultaneously also from a compressor that compresses hydrogen, thereby keeping the pressure value at which the filling of the pressure accumulator tank serving as the low-pressure bank ends from decreasing.

Specifically, in a first aspect of the invention, a hydrogen station includes: a booster unit that boosts hydrogen; a pressure accumulator unit that accumulates the hydrogen boosted by the booster unit; and a supply unit that supplies the hydrogen accumulated in the pressure accumulator unit to a target to be filled. The pressure accumulator unit includes at least three pressure accumulator tanks including: a first accumulator tank configured to accumulate the hydrogen in a first accumulation pressure range; a second accumulator tank configured to accumulate the hydrogen in a second accumulation pressure range lower than the first accumulation pressure range; and a third accumulator tank configured to accumulate the hydrogen in a third accumulation pressure range lower than the second accumulation pressure range. The hydrogen station further includes a pressure accumulator unit controller that performs control such that: when supplying the hydrogen from the supply unit to a first target to be filled, the second pressure accumulator tank initially supplies the hydrogen in the second accumulation pressure range; the first pressure accumulator tank secondly supplies the hydrogen in the first accumulation pressure range when the second pressure accumulator tank reaches the third pressure accumulation pressure range, and continues supplying the hydrogen until the first pressure accumulator tank reaches the second accumulation pressure range; and the third pressure accumulator tank accumulates the hydrogen boosted by the booster unit to the first accumulation pressure range; and when supplying the hydrogen from the supply unit to a next target to be filled, the first pressure accumulator tank initially supplies the hydrogen in the second accumulation pressure range; the third pressure accumulator tank secondly supplies the hydrogen in the first accumulation pressure range when the first pressure accumulator tank reaches the third pressure accumulation pressure range, and continues supplying the hydrogen until the third pressure accumulator tank reaches the second accumulation pressure range; and the second pressure accumulator tank accumulates the hydrogen boosted by the booster unit to the first accumulation pressure range. The hydrogen station further includes an assist controller that performs control such that a compressor unit configured to compress hydrogen supplies the hydrogen to the supply unit simultaneously while the pressure accumulator unit supplies the hydrogen to the supply unit.

According to this configuration, the pressure accumulator unit controller causes the at least three pressure accumulator tanks to function as the first, second, and third pressure accumulator tanks that sequentially change the accumulation pressure ranges for each target to be filled, so that hydrogen is supplied from the supply unit to the target to be filled. Thus, the plurality of pressure accumulator tanks is operated in the so-called bank rotation mode. Further, the compressor unit that compresses hydrogen simultaneously supplies hydrogen to the same supply unit. That is, the supply of hydrogen to the supply unit is assisted.

Since the compressor unit supplies hydrogen to the target to be filled simultaneously with the hydrogen supply from the pressure accumulator tank, the target to be filled receives a larger amount of hydrogen than from the pressure accumulator tank only. This can raise the pressure value at which the pressures of the tanks balance with each other in filling by differential pressure (the pressure value at the end of the filling) higher than that in the case where hydrogen is supplied only from the pressure accumulator tank.

Therefore, the pressure value of the pressure accumulator tank serving as the low-pressure bank, which is lowered at the end of the filling in the bank rotation mode, can be raised as high as possible.

Note that the number of pressure accumulator tanks may be four or five, as long as it is three or more, and is not particularly limited as long as the pressure accumulator tanks change the functions in rotation.

Further, the compressor unit that compresses hydrogen and is controlled by the assist controller may be configured to compress hydrogen only for this assist control, or to compress hydrogen for another function.

In addition, the target to be filled with hydrogen may be a fuel cell vehicle, and may also be a combustion device using hydrogen as a fuel, or a tracked vehicle that travels on a track.

In a second aspect of the invention, the assist controller performs control such that the compressor unit supplies the hydrogen to the supply unit even after the pressure accumulator unit has finished supplying the hydrogen to the supply unit.

According to this configuration, hydrogen is supplied from the compressor unit even after the pressure accumulator unit has finished supplying the hydrogen. Thus, hydrogen can be supplied at a high pressure to the target to be filled, without greatly increasing the maximum pressure value of the pressure accumulator tanks of the pressure accumulator unit.

Therefore, it is not necessary to raise the maximum pressure values of the pressure accumulator tanks, and a pressure fluctuation width (pressure amplitude) can be further reduced.

Further reducing the pressure fluctuation width of the pressure accumulator tanks can reduce a burden on the pressure accumulator tanks, and can improve the durability of the pressure accumulator tanks.

In a third aspect of the invention, the compressor unit also serves as the booster unit that boosts the hydrogen.

According to this configuration, a single compressor means (compressor) can serve as both of the compressor unit that compresses hydrogen and the booster unit that boosts hydrogen. Thus, the equipment cost can be made lower than the cost required when the compressor unit and the booster unit are separately prepared.

This can further reduce the cost required for installing and maintaining the hydrogen station.

A fourth aspect of the present invention is directed to a method for operating a hydrogen station including: a booster unit that boosts hydrogen; a pressure accumulator unit that accumulates the hydrogen boosted by the booster unit; and a supply unit that supplies the hydrogen accumulated in the pressure accumulator unit to a target to be filled. The pressure accumulator unit including at least three pressure accumulator tanks including: a first accumulator tank configured to accumulate the hydrogen in a first accumulation pressure range; a second accumulator tank configured to accumulate the hydrogen in a second accumulation pressure range lower than the first accumulation pressure range; and a third accumulator tank configured to accumulate the hydrogen in a third accumulation pressure range lower than the second accumulation pressure range. The method includes: a first supply of hydrogen of supplying the hydrogen from the supply unit to a first target to be filled, wherein the second pressure accumulator tank initially supplies the hydrogen in the second accumulation pressure range, the first pressure accumulator tank secondly supplies the hydrogen in the first accumulation pressure range when the second pressure accumulator tank reaches the third pressure accumulation pressure range, and continues supplying the hydrogen until the first pressure accumulator tank reaches the second accumulation pressure range, and the third pressure accumulator tank accumulates the hydrogen boosted by the booster unit to the first accumulation pressure range; and a second supply of hydrogen of supplying the hydrogen from the supply unit to a next target to be filled, wherein the first pressure accumulator tank initially supplies the hydrogen in the second accumulation pressure range, the third pressure accumulator tank secondly supplies the hydrogen in the first accumulation pressure range when the first pressure accumulator tank reaches the third pressure accumulation pressure range, and continues supplying the hydrogen until the third pressure accumulator tank reaches the second accumulation pressure range, and the second pressure accumulator tank accumulates the hydrogen boosted by the booster unit to the first accumulation pressure range. In the first supply of hydrogen and the second supply of hydrogen, a compressor unit that compresses hydrogen supplies the hydrogen to the supply unit simultaneously while the pressure accumulator unit supplies the hydrogen to the supply unit.

According to this configuration, in the first supply of hydrogen and the second supply of hydrogen, the at least three pressure accumulator tanks function as the first, second, and third pressure accumulator tanks that sequentially change the accumulation pressure ranges for each target to be filled, so that hydrogen is supplied from the supply unit to the target to be filled. Thus, the plurality of pressure accumulator tanks is operated in the so-called bank rotation mode. Further, the compressor unit that compresses hydrogen simultaneously supplies hydrogen to the same supply unit. That is, the supply of hydrogen to the supply unit is assisted.

Since the compressor unit supplies hydrogen to the target to be filled simultaneously with the hydrogen supply from the pressure accumulator tank, the target to be filled receives a larger amount of hydrogen than from the pressure accumulator tank only. This can raise the pressure value at which the pressures of the tanks balance with each other in filling by differential pressure (the pressure value at the end of the filling) higher than that in the case where hydrogen is supplied only from the pressure accumulator tank.

Therefore, the pressure value of the pressure accumulator tank serving as the low-pressure bank, which is lowered at the end of the filling in the bank rotation mode, can be raised as high as possible.

In a fifth aspect of the invention, the compressor unit supplies the hydrogen to the supply unit even after the pressure accumulator unit has finished supplying the hydrogen to the supply unit.

According to this configuration, hydrogen is supplied from the compressor unit even after the pressure accumulator unit has finished supplying the hydrogen. Thus, hydrogen can be supplied at a high pressure to the target to be filled, without greatly increasing the maximum pressure value of the pressure accumulator tanks of the pressure accumulator unit.

Therefore, it is not necessary to raise the maximum pressure values of the pressure accumulator tanks, and a pressure fluctuation width (pressure amplitude) can be further reduced.

Further reducing the pressure fluctuation width of the pressure accumulator tanks can reduce a burden on the pressure accumulator tanks, and can improve the durability of the pressure accumulator tanks.

In a sixth aspect of the invention, the compressor unit also serves as the booster unit and supplies the hydrogen to the supply unit.

According to this configuration, the compressor unit also serves as the booster unit, and supplies hydrogen to the supply unit. This no longer requires another compressor means that assists the supply of hydrogen, and can reduce the equipment cost.

This can further reduce the cost required for installing and maintaining the hydrogen station.

Advantages of the Invention

As can be seen in the foregoing, according to the present invention, the compressor unit supplies hydrogen to the target to be filled simultaneously with the hydrogen supply from the pressure accumulator tank, and the target to be filled receives a larger amount of hydrogen than from the pressure accumulator tank only. This can raise the pressure value at which the pressures of the tanks balance with each other in filling by differential pressure (the pressure value at the end of the filling) higher than that in the case where hydrogen is supplied only from the pressure accumulator tank.

Therefore, regarding the hydrogen station operated in the bank rotation mode and the method for operating the hydrogen station, the present invention makes it possible to reliably achieve the goal of keeping the pressure value of the pressure accumulator tank serving as the low-pressure bank at the end of the filling from decreasing, thereby reducing the replacement frequency of the pressure accumulator tank.

BRIEF DESCRIPTION OF THE DRAWINGS

FIG. 10 is a timing diagram of pressure changes for illustrating the advantage of the mode of the present invention.

DESCRIPTION OF EMBODIMENTS

Embodiments of the present invention will be described in detail with reference to the drawings. The following description of preferred embodiments is only an example in nature, and is not intended to limit the scope, applications or use of the present invention.

First Embodiment

First, a general configuration of a hydrogen station of the first embodiment will be described with reference to FIG. 1.

Figure 1:
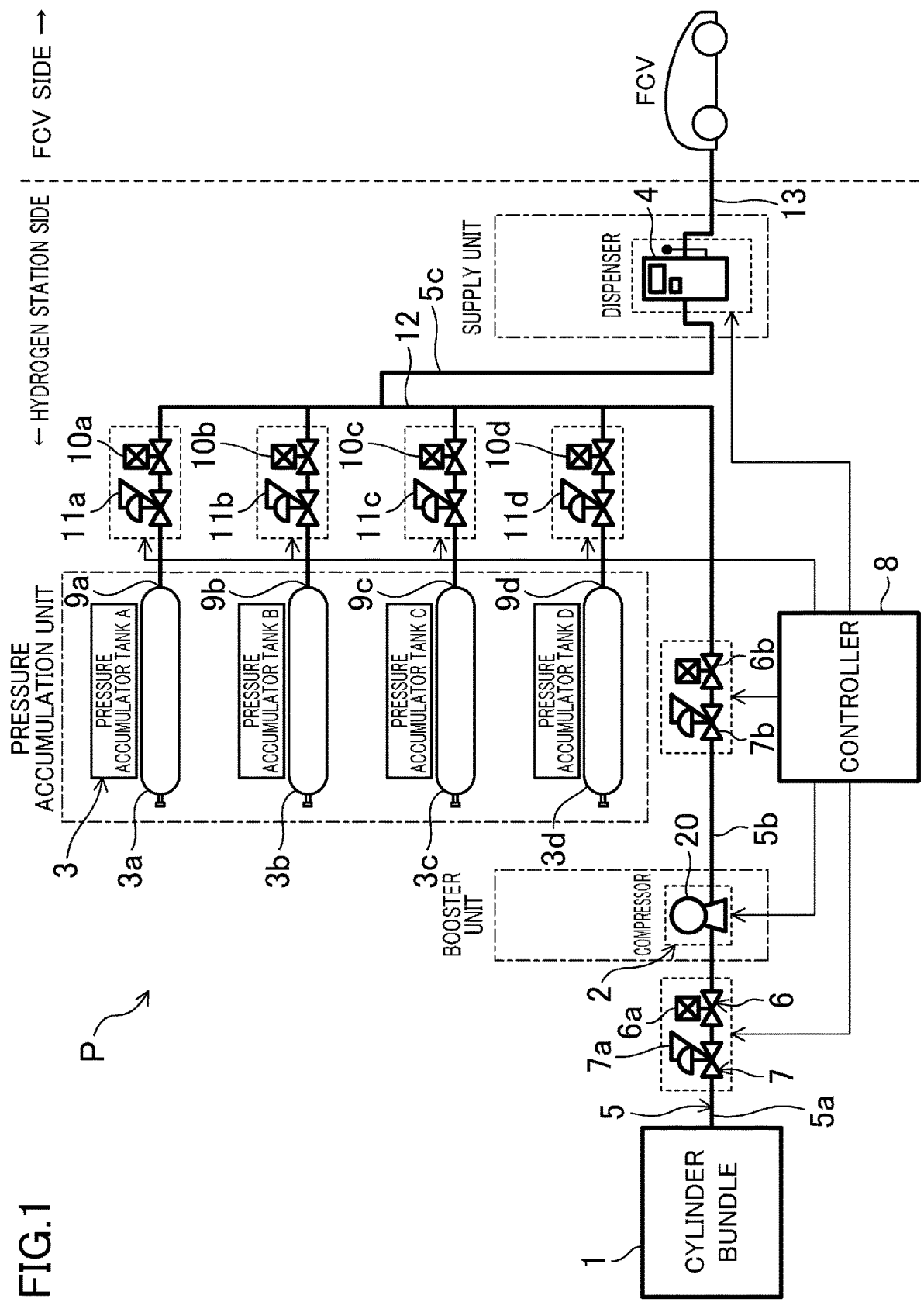
FIG. 1 is a system configuration diagram illustrating a general configuration of a hydrogen station according to a first embodiment of the present invention.

As shown in a system configuration diagram of FIG. 1, a hydrogen station P of the present embodiment includes: a cylinder bundle 1 that is a holder holding a large amount of hydrogen therein; a compressor 2 that is a booster unit boosting the hydrogen extracted from the cylinder bundle 1; a plurality of pressure accumulator tanks 3 serving as a pressure accumulator unit accumulating the boosted hydrogen therein; and a dispenser 4 that is a supply unit supplying the hydrogen accumulated in the pressure accumulator tanks 3 to a target to be filled which is a fuel cell car, i.e., a fuel cell vehicle (FCV).

These components are connected to each other by hydrogen supply lines 5, and an electromagnetic open/close valve 6 and a pressure-reducing valve 7 are provided in the middle of each of the hydrogen supply lines. Further, a controller 8 for controlling the electromagnetic open/close valves and other components is provided to suitably operate these components.

Although not illustrated in detail, the controller 8 includes an information input unit that takes in various kinds of information, a memory that stores various kinds of control programs, an arithmetic unit that calculates the information taken in using the control program, and an output unit that outputs a control signal obtained by the arithmetic unit.

The cylinder bundle 1 is comprised of well-known containers, and holds a large amount of hydrogen therein. Pressure inside the cylinder bundle 1 is set to, for example, about 20 MPa. A first electromagnetic open/close valve 6a and a first pressure-reducing valve 7a are provided for a first hydrogen supply line 5a downstream of the cylinder bundle 1. When the first electromagnetic open/close valve 6a is opened by an open signal from the controller 8, hydrogen is extracted from the cylinder bundle 1 to the downstream.

The compressor 2 is comprised of a well-known compression pump 20, for example, a compression pump 20 having a compressibility performance of about 340 Nm³/h. The hydrogen extracted from the cylinder bundle 1 is boosted by the compressor 2, and the high-pressure hydrogen flows into a second hydrogen supply line 5b downstream of the compressor 2. A second electromagnetic open/close valve 6b and a second pressure-reducing valve 7b are provided for the second hydrogen supply line 5b, and the second electromagnetic open/close valve 6b is configured to open and close by an open/close signal from the controller 8.

The pressure accumulator tanks 3a to 3d are comprised of the same tanks, e.g., four composite pressure accumulator tanks 3a to 3d each having a liner made of a metallic material, and being reinforced with an FRP material. The maximum pressure is about 82 MPa, and the capacity is about 300 liters. The four pressure accumulator tanks 3a to 3d are respectively defined, for example, as a pressure accumulator tank A3a, a pressure accumulator tank B3b, a pressure accumulator tank C3c, and a pressure accumulator tank D3d from the top, and each of the pressure accumulator tanks 3a to 3d is configured to accumulate the boosted hydrogen therein.

Each of the pressure accumulator tanks 3a to 3d has a range of pressure change of, for example, 82 MPa to 45 MPa, and its pressure value is determined by the amount of hydrogen accumulated therein.

The plurality of pressure accumulator tanks 3a to 3d of the present embodiment is controlled so that the pressure accumulator tanks have different pressure values, and is operated in a so-called "bank rotation" mode in which the pressure value changes for each vehicle to be filled.

The "bank rotation" mode is an operation method of the hydrogen station P, in which a plurality of pressure accumulator tanks, e.g., four pressure accumulator tanks 3a to 3d, are prepared, and their pressure values at the start of the supply are varied. Each of the pressure accumulator tanks 3a to 3d serves the functions as a low-pressure bank, a medium-pressure bank, a high-pressure bank, and a recovery/standby bank, and changes the functions in rotation for every supply (for each FCV to be filled).

According to this operation method, for example, in the case where the four functions are given to each of the four pressure accumulator tanks 3a to 3d, each of the pressure accumulator tanks 3a to 3d requires the boosting (pressure recovery) only once every four supplies, which can reduce the total number of pressure accumulation cycles.

A specific operation method in the "bank rotation" mode method will be described later.

Hydrogen supply line branches 9a to 9d for supplying and discharging hydrogen are respectively connected to one ends of the plurality of pressure accumulator tanks 3a to 3d. The hydrogen supply line branches 9a to 9d are respectively provided with electromagnetic open/close valves 10a to 10d and pressure-reducing valves 11a to 11d. For example, from top to bottom, an electromagnetic open/close valve A10a and a pressure-reducing valve A11a are provided for a hydrogen supply line branch A9a; an electromagnetic open/close valve B10b and a pressure-reducing valve B11b are provided for a hydrogen supply line branch B9b; an electromagnetic open/close valve C10c and a pressure-reducing valve C11c are provided for a hydrogen supply line branch C9c; and an electromagnetic open/close valve D10d and a pressure-reducing valve D11d are provided for a hydrogen supply line branch D9d.

Among them, the electromagnetic open/close valves A10a to D10d are opened and closed by an open/close control signal from the controller 8, so that the hydrogen supply line branches A9a to D9d can supply and discharge hydrogen to and from the pressure accumulator tanks A3a to D3d.

For each of the hydrogen supply line branches A9a to D9d, a supply line and a discharge line may be provided separately, and the electromagnetic open/close valve 10 and the pressure-reducing valve 11 may be provided for each of the lines. In such a configuration, the supply and discharge of hydrogen can be controlled more precisely.

The dispenser 4 is configured to receive hydrogen supplied from the plurality of pressure accumulator tanks 3a to 3d, and fill the FCV, which is a target to be filled, with hydrogen.

More specifically, a main hydrogen supply line 12 that gathers the hydrogen supply line branches 9a to 9d and a second hydrogen supply line 5b is provided upstream of the dispenser 4, and a third hydrogen supply line 5c is connected to an intermediate position of the main hydrogen supply line 12 to receive the supply of hydrogen from the main hydrogen supply line 12.

The dispenser 4 is provided with a hydrogen supply hose 13 to be connected to the FCV. A coupler (not shown) is provided at a tip end of the hydrogen supply hose 13, so that the hydrogen supply hose 13 is connected to the FCV via the coupler. Although not shown, the dispenser 4 is provided with a flow rate control valve or any other suitable component to control the flow rate and speed of hydrogen to be supplied to the FCV.

Further, although not shown, the dispenser 4 is provided with an information detection unit that detects information of the FCV, and an information communication unit that exchanges information with the FCV.

Information of the FCV obtained by the information detection unit and the information communication unit is transmitted to the controller 8 via a communication line or the like. The information of the FCV is used for controlling the operation of the hydrogen station P by the controller 8, which will be described later.

Although not shown, detection units such as sensors are installed in different parts and locations to input various kinds of detection information to the controller 8.

Figure 2:
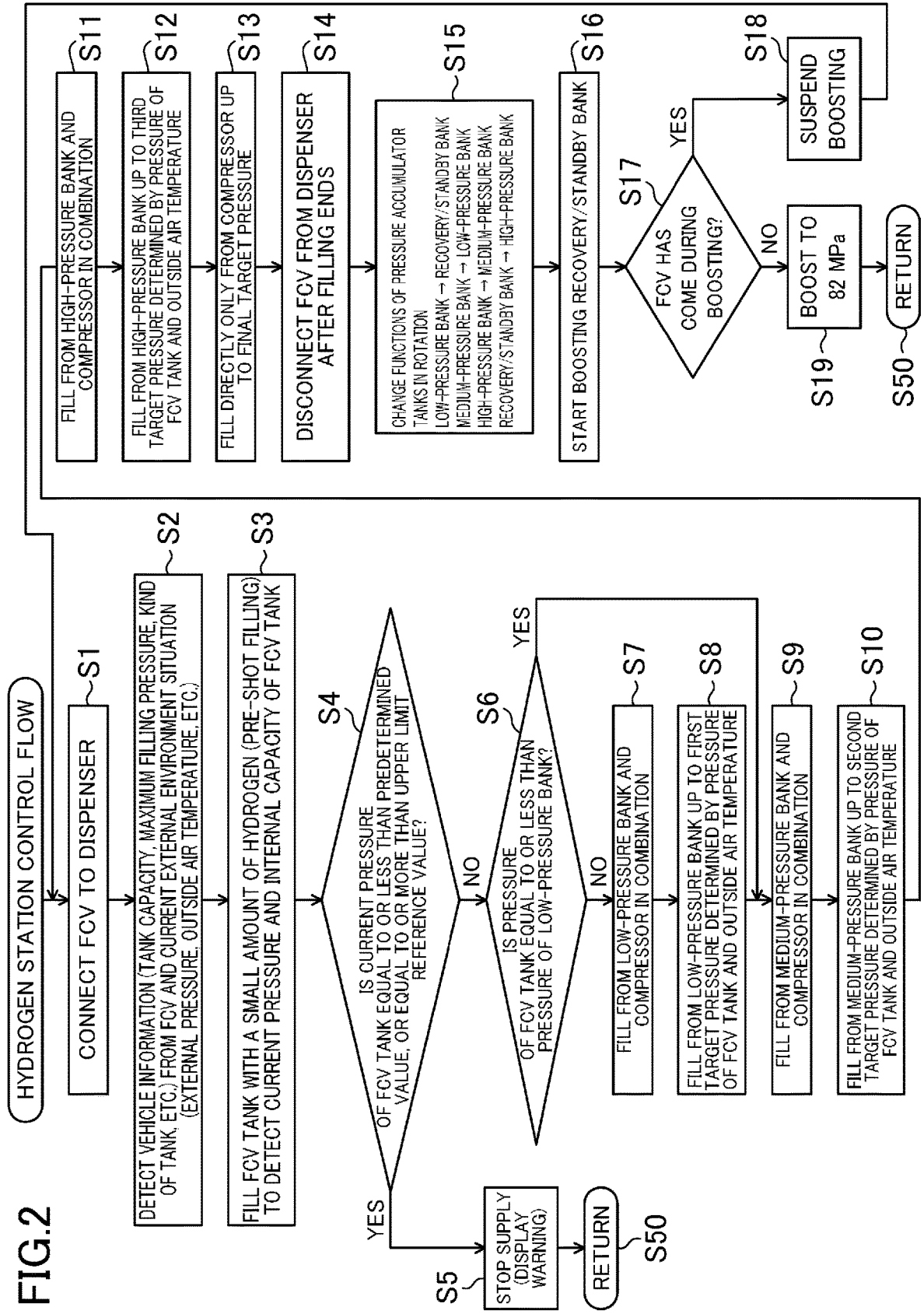
FIG. 2 is a flowchart illustrating how the hydrogen station of the first embodiment is operated.

Next, a method for operating the hydrogen station P configured as described above will be described with reference to a flowchart of operation control of the hydrogen station shown in FIG. 2.

First, in S1, the FCV, which is a target to be filled, is connected to the dispenser 4. This connection is achieved by connecting the tip end of the hydrogen supply hose 13 to the FCV. Then, in S2, vehicle information is detected from the FCV. For example, the capacity of a tank to be filled (not shown) of the FCV, the maximum filling pressure of the tank, and the type of the tank are detected. At the same time, a current external environment situation is also detected. For example, an external pressure (atmospheric pressure), and an outside air temperature are detected.

Then, in S3, so-called pre-shot filling is performed, i.e., a small amount of hydrogen is introduced (injected) in advance into the tank to be filled of the FCV. The current pressure and internal capacity of the tank to be filled of the FCV are detected by performing this pre-shot filling.

Then, in S4, whether the current pressure of the tank to be filled of the FCV is equal to or less than a predetermined value, or equal to or more than an upper limit reference value is determined. This step determines whether the tank of the FCV to be filled from now on is in an appropriate pressure state that allows the tank to withstand the filling. Specifically, when the pressure is equal to or less than the predetermined value, it is conceivable that the tank to be filled is damaged and cannot be filled with high-pressure hydrogen. When the pressure is equal to or more than the upper limit reference value, it is conceivable that the tank to be filled already contains the high-pressure hydrogen, and hydrogen cannot be introduced any more into the tank. As such, these determinations are made before introducing hydrogen.

If the answer is YES in S4, the flow proceeds to S5, and the supply of hydrogen is stopped. Specifically, no hydrogen is supplied. Then, warning is displayed on a display unit of the dispenser 4 to notify a worker that hydrogen cannot be supplied. Then, the flow proceeds to S50 to return, and the control ends.

On the other hand, if the answer is NO in S4, the flow proceeds to S6, and whether the pressure of the tank to be filled of the FCV is equal to or less than the pressure of the low-pressure bank is determined. If the pressure of the tank to be filled of the FCV is higher than the pressure of the low-pressure bank, hydrogen cannot be supplied from the low pressure-bank when filling the tank with hydrogen by differential pressure. For this reason, whether the pressure of the tank to be filled is lower than the pressure of the low-pressure bank or not is determined in advance. For example, if a pressure value of the low-pressure bank is 63 MPa, whether a pressure value of the tank to be filled of the FCV is lower than 63 MPa is determined.

If the answer is YES in S6, the flow proceeds to S7. In S7, filling from the low-pressure bank and the compressor 2 in combination is performed. The filling from the low-pressure bank and the compressor 2 in combination causes hydrogen accumulated in the low-pressure bank and hydrogen compressed by the compressor 2 to be simultaneously introduced into the tank to be filled of the FCV. Details of the filling from the low-pressure bank and the compressor in combination will be described later.

Thereafter, in S8, filling from the low-pressure bank is performed up to a first target pressure determined by the pressure of the tank to be filled of the FCV and the outside air temperature. The first target pressure is set lower than the pressure value of the low-pressure bank. For example, if the pressure value of the low-pressure bank is 63 MPa, the first target pressure is set to 45 MPa. When the filling with hydrogen is performed up to the first target pressure, the pressure of the low-pressure bank balances with the pressure of the tank to be filled of the FCV, and hydrogen cannot be supplied any more. Thus, the filling from the low-pressure bank ends.

In place of the first target pressure, a target pressure increase rate (the amount of pressure increase per hour) may be calculated from a predetermined standard table, and whether the pressure of the tank to be filled increases within an allowable fluctuation range of the target pressure increase rate or not is detected. If the increase in pressure slows down and the pressure is about to fall below the allowable fluctuation range, the filling from the low-pressure bank may be finished immediately before the slowing down.

Then, the flow proceeds to S9. If the answer is NO in S6, i.e., if the pressure of the tank to be filled of the FCV is determined to be higher than the pressure of the low-pressure bank, the flow also proceeds to S9.

In S9, filling from the medium-pressure bank and the compressor 2 in combination is performed. The filling from the medium-pressure bank and the compressor 2 in combination causes hydrogen accumulated in the medium-pressure bank and hydrogen compressed by the compressor 2 to be simultaneously introduced into the tank to be filled of the FCV. Details of the filling from the medium-pressure bank and the compressor 2 in combination will be described later.

Thereafter, in S10, filling from the medium-pressure bank is performed up to a second target pressure determined by the pressure of the tank to be filled of the FCV and the outside air temperature. The second target pressure is set lower than the pressure value of the medium-pressure bank. For example, if the pressure value of the medium-pressure bank is 72 MPa, the second target pressure is set to 63 MPa. When the filling with hydrogen is performed up to the second target pressure, the pressure of the medium-pressure bank balances with the pressure of the tank to be filled of the FCV, and hydrogen cannot be supplied any more. Thus, the filling from the medium-pressure bank ends.

Also in place of the second target pressure, a target pressure increase rate (the amount of pressure increase per hour) may be calculated from a predetermined standard table, and whether the pressure of the tank to be filled increases within an allowable fluctuation range of the target pressure increase rate or not is detected. If the increase in pressure slows down and the pressure is about to fall below the allowable fluctuation range, the filling from the medium-pressure bank may be finished immediately before the slowing down.

Thereafter, the flow proceeds to S11. In S11, filling from the high-pressure bank and the compressor 2 in combination is performed. The filling from the high-pressure bank and the compressor 2 in combination causes hydrogen accumulated in the high-pressure bank and hydrogen compressed by the compressor 2 to be simultaneously introduced into the tank to be filled of the FCV. Details of the filling from the high-pressure bank and the compressor 2 in combination will be described later.

Thereafter, in S12, filling from the high-pressure bank is performed up to a third target pressure determined by the pressure of the tank to be filled of the FCV and the outside air temperature. The third target pressure is set lower than the pressure value of the high-pressure bank. For example, if the pressure value of the high-pressure bank is 82 MPa, the third target pressure is set to 72 MPa. When the filling with hydrogen is performed up to the third target pressure, the pressure of the high-pressure bank balances with the pressure of the tank to be filled of the FCV, and hydrogen cannot be supplied any more. Thus, the filling from the high-pressure bank ends.

Also in place of the third target pressure, a target pressure increase rate (the amount of pressure increase per hour) may be calculated from a predetermined standard table, and whether the pressure of the tank to be filled increases within an allowable fluctuation range of the target pressure increase rate or not is detected. If the increase in pressure slows down and the pressure is about to fall below the allowable fluctuation range, the filling from the high-pressure bank may be finished immediately before the slowing down.

Then, in S13, the filling is performed using only the hydrogen compressed in the compressor 2 (direct filling) up to a final target pressure. For example, if the tank to be filled of the FCV has been filled with hydrogen to 68 MPa by the filling from the pressure accumulator tanks, the compressor 2 supplies compressed hydrogen to the tank to be filled of the FCV until the pressure reaches 70 MPa which is the final target pressure. Details of the direct filling will also be described later.

Then, when the series of filling ends, the flow proceeds to S14, and the FCV is disconnected from the dispenser 4. Thus, the filling of the first FCV ends.

Thereafter, the control method of the hydrogen station P proceeds to S15. In S15, the functions of the four pressure accumulator tanks 3a to 3d are sequentially changed. Specifically, the low-pressure bank changes its function to the recovery/standby bank, the medium-pressure bank to the low-pressure bank, the high-pressure bank to the medium-pressure bank, and the recovery/standby bank to the high-pressure bank. Through this step, when filling the FCV next time, each of the pressure accumulator tanks 3a to 3d is used to perform the function different from the previous one. Since the functions of the pressure accumulator tanks 3a to 3d are changed in rotation at every filling of the FCV in this way, this operation mode is referred to as the "bank rotation" mode.

Then, in S16, the boosting of the recovery/standby bank is started. This boosting is performed by the compressor 2 described above. Details of the boosting of the recovery/standby bank will be described later.

Then, in S17, whether the FCV has come in the course of the boosting is determined. If the FCV has come, the answer YES is selected. Then, the flow proceeds to S18 to suspend the boosting of the compressor, and returns to S1 to prepare for the next filling of the FCV with hydrogen. This is because the single compressor 2 is used to boost the recovery/standby bank, and also to assist the hydrogen supply to (filling of) the tank to be filled of the FCV. In this way, if the next FCV comes in the course of the boosting, the boosting of the recovery/standby bank is suspended to give priority to the filling of the FCV with hydrogen (to assist the filling).

If the answer is NO in S17, i.e., if the FCV has not come in the course of the boosting, the flow proceeds to S19 to perform the boosting up to, for example, 82 MPa, which is the maximum pressure value of the pressure accumulator tanks 3a to 3d when serving as the recovery/standby bank.

Thereafter, when the boosting of the recovery/standby bank ends, the flow proceeds to S50 to return, and the control ends.

Next, referring to the schematic views of FIGS. 3 to 7, the "filling from the low-pressure bank and the compressor in combination," the "filling from the medium-pressure bank and the compressor in combination," the "filling from the high-pressure bank and the compressor in combination," the "direct filling from the compressor," and the "boosting of the recovery/standby bank" will be described in detail below.

Figure 3:
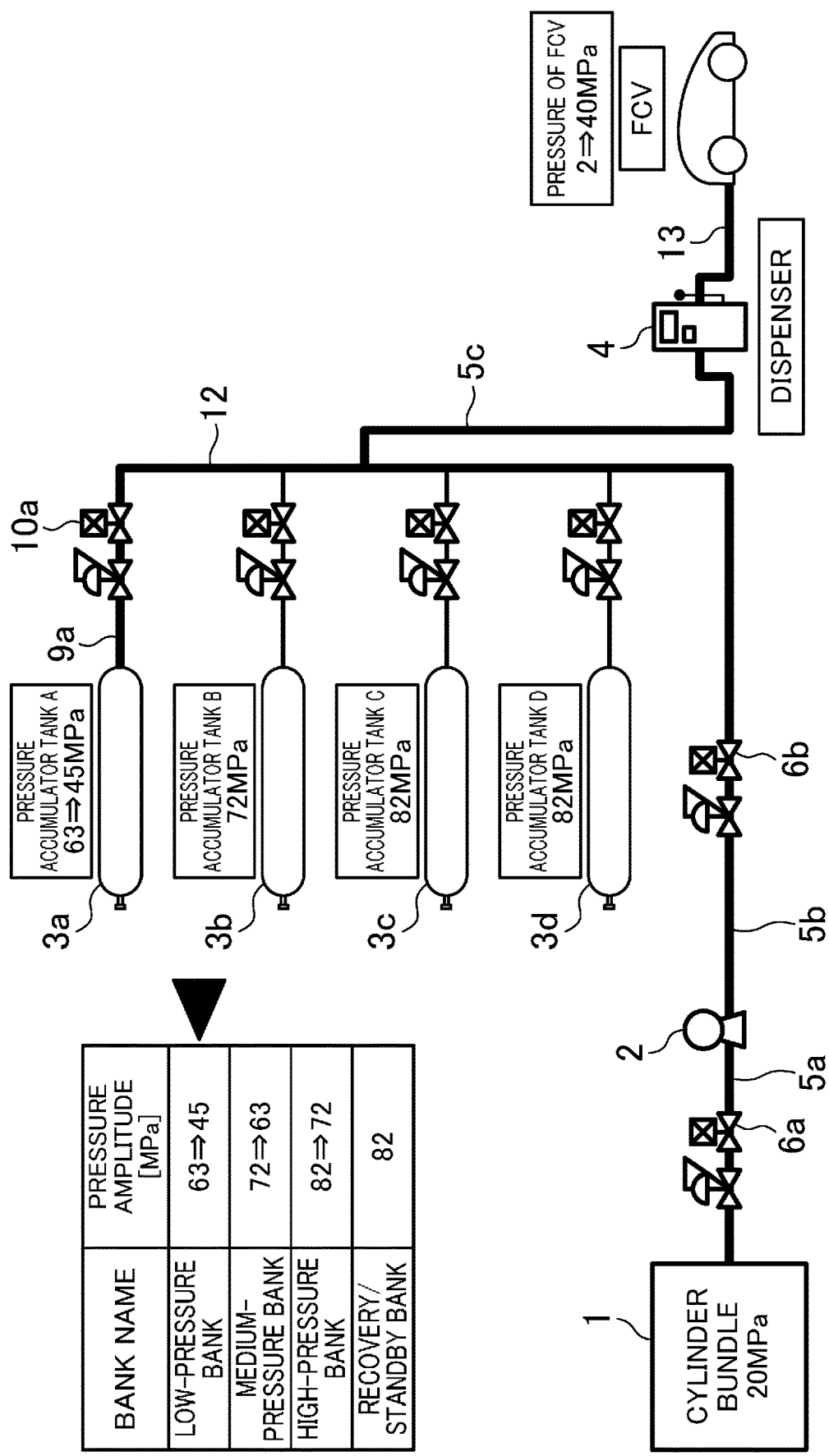
FIG. 3 is a schematic view illustrating a low-pressure bank step in a bank rotation mode.

FIG. 3 is a schematic view illustrating a low-pressure bank step (a step of filling the tank from the low-pressure bank) in the bank rotation mode. Specifically, as shown in the upper left table, this is a step of filling the tank with hydrogen from the low-pressure bank among the plurality of pressure accumulator tanks 3a to 3d, from 63 MPa to 45 MPa, for example. The low-pressure bank step is also a step of "filling from the low-pressure bank and the compressor in combination."

As shown in FIG. 3, for example, if the pressure accumulator tank A3a is used as the low-pressure bank, the controller 8 (see FIG. 1) sends an open control signal to the electromagnetic open/close valve A10a to open the electromagnetic open/close valve A10a, so that hydrogen in the pressure accumulator tank A3a can be supplied to the tank to be filled (not shown) of the FCV. In parallel with this, the controller 8 sends an open control signal to the first and second electromagnetic open/close valves 6a and 6b to open the first and second electromagnetic open/close valves 6a and 6b, so that hydrogen can be supplied also from the compressor 2 to the tank to be filled of the FCV.

The control performed as described above causes hydrogen to be supplied from the pressure accumulator tank A3a serving as the low-pressure bank to the dispenser 4 through the hydrogen supply line branch A9a, the main hydrogen supply line 12, and the third hydrogen supply line 5c. Further, hydrogen from the cylinder bundle 1 is compressed in the compressor 2, and then supplied to the dispenser 4 through the first hydrogen supply line 5a, the second hydrogen supply line 5b, the main hydrogen supply line 12, and the third hydrogen supply line 5c (the lines in which hydrogen flows are drawn thick). In this way, the filling from the low-pressure bank and the compressor 2 in combination is performed.

Then, hydrogen supplied from the low-pressure bank and the compressor 2 to the dispenser 4 is supplied to the FCV through the hydrogen supply hose 13. At this time, the tank of the FCV is filled with hydrogen so that the pressure of the tank increases from 2 MPa to 40 MPa, for example.

As described above, supplying hydrogen not only from the low-pressure bank but also from the compressor 2 can fill the tank with hydrogen in a shorter time than supplying hydrogen only from the low-pressure bank. Further, supplying hydrogen not only from the low-pressure bank but also from the compressor 2 as an assist can raise the lower limit pressure of the low-pressure bank higher than that in the case where the tank is filled with hydrogen only from the low-pressure bank by the differential pressure. This will be described later in detail.

When the filling from the low-pressure bank and the compressor 2 in combination in the low-pressure bank step is finished, the filling from the medium-pressure bank and the compressor 2 in combination in a medium-pressure bank step starts.

Figure 4:
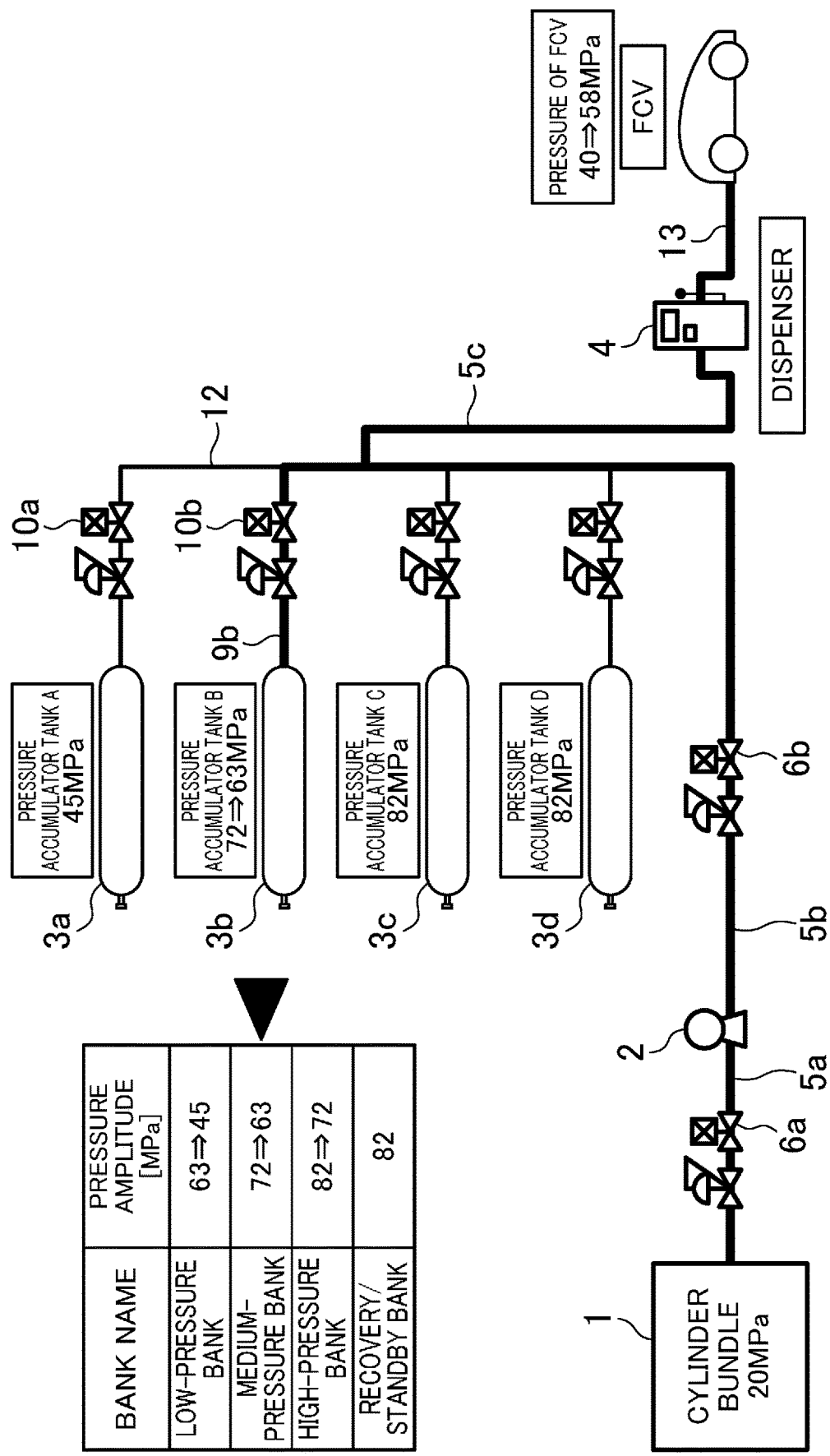
FIG. 4 is a schematic view illustrating a medium-pressure bank step in the bank rotation mode.

FIG. 4 is a schematic view illustrating a medium-pressure bank step (a step of filling the tank from the medium-pressure bank) in the bank rotation mode. Specifically, as shown in the upper left table, this is a step of filling the tank with hydrogen from the medium-pressure bank among the plurality of pressure accumulator tanks, from 72 MPa to 63 MPa, for example. The medium-pressure bank step is also a step of "filling from the medium-pressure bank and the compressor in combination."

As shown in FIG. 4, for example, if the pressure accumulator tank B3b is used as the medium-pressure bank, the controller 8 (see FIG. 1) sends an open control signal to the electromagnetic open/close valve B10b to open the electromagnetic open/close valve B10b, so that hydrogen in the pressure accumulator tank B3b can be supplied to the tank to be filled of the FCV. In parallel with this, the controller 8 sends an open control signal to the first and second electromagnetic open/close valves 6a and 6b to open the first and second electromagnetic open/close valves 6a and 6b, so that hydrogen can be supplied also from the compressor 2 to the tank to be filled of the FCV. Before sending these signals, the hydrogen supply from the low-pressure bank is stopped, and a close signal is sent to the electromagnetic open/close valve A10a to close the electromagnetic open/close valve A10a, so that the inflow (backflow) of hydrogen to the low-pressure bank is blocked.

The control performed as described above causes hydrogen to be supplied from the pressure accumulator tank B3b serving as the medium-pressure bank to the dispenser 4 through the hydrogen supply line branch B9b, the main hydrogen supply line 12, and the third hydrogen supply line 5c. Further, hydrogen from the cylinder bundle 1 is compressed in the compressor 2, and then supplied to the dispenser 4 through the first hydrogen supply line 5a, the second hydrogen supply line 5b, the main hydrogen supply line 12, and the third hydrogen supply line 5c (the lines in which hydrogen flows are drawn thick just like in FIG. 3). In this way, the filling from the medium-pressure bank and the compressor 2 in combination is performed.

Then, hydrogen supplied from the medium-pressure bank and the compressor 2 to the dispenser 4 is supplied to the FCV through the hydrogen supply hose 13. At this time, the tank of the FCV is filled with hydrogen so that the pressure of the tank increases from 40 MPa to 58 MPa, for example.

As described above, supplying hydrogen not only from the medium-pressure bank but also from the compressor 2 can fill the tank with hydrogen in a shorter time than supplying hydrogen only from the medium-pressure bank. Also in this case, supplying hydrogen not only from the medium-pressure bank but also from the compressor 2 as an assist can raise the lower limit pressure of the medium-pressure bank higher than that in the case where the tank is filled with hydrogen only from the medium-pressure bank by the differential pressure.

When the filling from the medium-pressure bank and the compressor 2 in combination in the medium-pressure bank step is finished, the filling from the high-pressure bank and the compressor 2 in combination in a high-pressure bank step starts.

Figure 5:
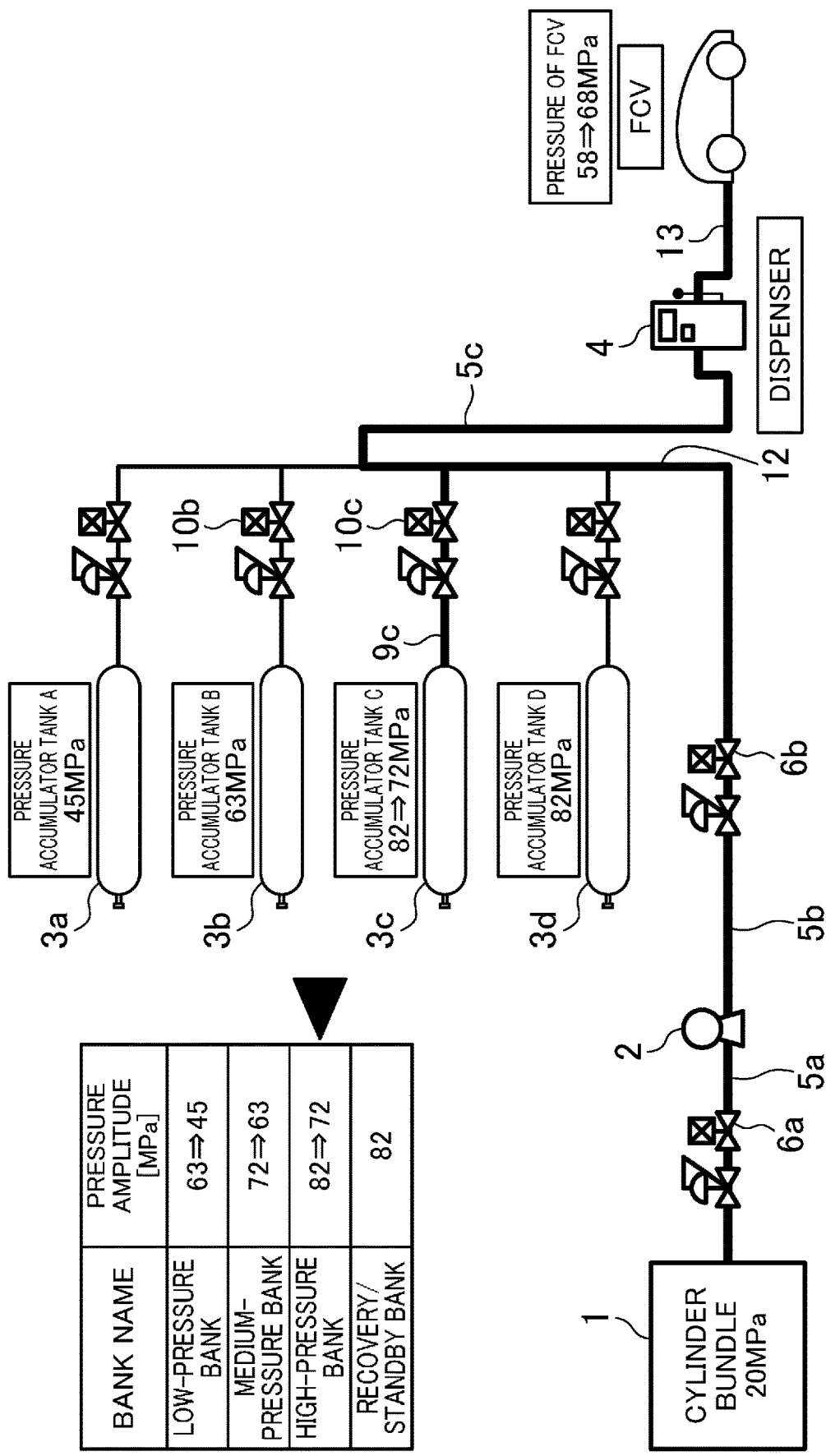
FIG. 5 is a schematic view illustrating a high-pressure bank step in the bank rotation mode.

FIG. 5 is a schematic view illustrating a high-pressure bank step (a step of filling the tank from the high-pressure bank) in the bank rotation mode. Specifically, as shown in the upper left table, this is a step of filling the tank with hydrogen from the high-pressure bank among the plurality of pressure accumulator tanks, from 82 MPa to 72 MPa, for example. The high-pressure bank step is also a step of "filling from the high-pressure bank and the compressor in combination."

As shown in FIG. 5, for example, if the pressure accumulator tank C3c is used as the high-pressure bank, the controller 8 (see FIG. 1) sends an open control signal to the electromagnetic open/close valve C10c to open the electromagnetic open/close valve C10c, so that hydrogen in the pressure accumulator tank C3c can be supplied to the tank to be filled of the FCV. In parallel with this, the controller 8 sends an open control signal to the first and second electromagnetic open/close valves 6a and 6b to open the first and second electromagnetic open/close valves 6a and 6b, so that hydrogen can be supplied also from the compressor 2 to the tank to be filled of the FCV. Before sending these signals, the hydrogen supply from the medium-pressure bank is stopped, and a close signal is sent to the electromagnetic open/close valve B10b to close the electromagnetic open/close valve B10b, so that the inflow (backflow) of hydrogen to the medium-pressure bank is blocked.

The control performed as described above causes hydrogen to be supplied from the pressure accumulator tank C3c serving as the high-pressure bank to the dispenser 4 through the hydrogen supply line branch C9c, the main hydrogen supply line 12, and the third hydrogen supply line 5c. Further, hydrogen from the cylinder bundle 1 is compressed in the compressor 2, and then supplied to the dispenser 4 through the first hydrogen supply line 5a, the second hydrogen supply line 5b, the main hydrogen supply line 12, and the third hydrogen supply line 5c (the lines in which hydrogen flows are drawn thick just like in FIGS. 3 and 4). In this way, the filling from the high-pressure bank and the compressor 2 in combination is performed.

Then, hydrogen supplied from the high-pressure bank and the compressor 2 to the dispenser 4 is supplied to the FCV through the hydrogen supply hose 13. At this time, the tank of the FCV is filled with hydrogen so that the pressure of the tank increases from 58 MPa to 68 MPa, for example.

As described above, supplying hydrogen not only from the high-pressure bank but also from the compressor 2 can fill the tank with hydrogen in a shorter time than supplying hydrogen only from the high-pressure bank. Also in this case, supplying hydrogen not only from the high-pressure bank but also from the compressor 2 as an assist can raise the lower limit pressure of the high-pressure bank higher than that in the case where the tank is filled with hydrogen only from the high-pressure bank by the differential pressure.

When the filling from the high-pressure bank and the compressor 2 in combination in the high-pressure bank step is finished, the filling from the compressor 2 only, i.e., a direct filling step, starts.

Figure 6:
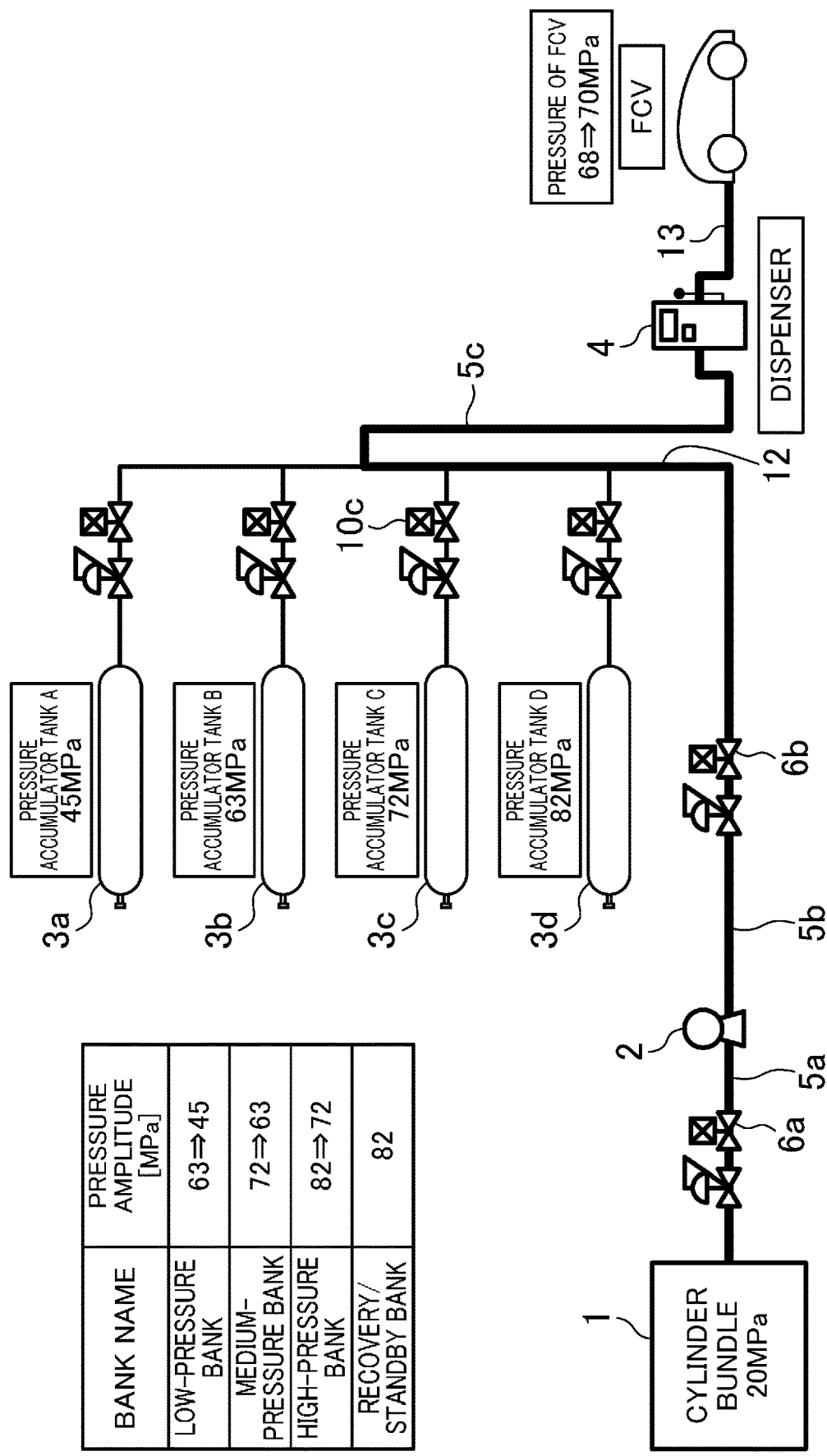
FIG. 6 is a schematic view illustrating a direct filling step in the bank rotation mode.

FIG. 6 is a schematic view illustrating the direct filling step (a step of filling the tank only from the compressor 2) in the bank rotation mode. Specifically, as shown in the upper left table, this is a step of filling the tank with hydrogen only from the compressor, without using the pressure accumulator tanks. This step is also a step of "direct filling from the compressor."

As shown in FIG. 6, for example, when hydrogen is supplied only from the compressor 2, the controller 8 (see FIG. 1) sends an open control signal to the first and second electromagnetic open/close valves 6a and 6b to open the electromagnetic open/close valves 6a and 6b, so that hydrogen can be supplied from the compressor 2 to the tank to be filled of the FCV. Before sending these signals, the hydrogen supply from the high-pressure bank is stopped, and a close signal is sent to the electromagnetic open/close valve C10c to close the electromagnetic open/close valve C10c, so that the inflow (backflow) of hydrogen to the high-pressure bank is blocked.

While the control performed as described above causes no hydrogen to be supplied from the pressure accumulator tanks 3a to 3d to the dispenser 4, hydrogen from the cylinder bundle 1 is compressed in the compressor 2, and then supplied to the dispenser 4 through the first hydrogen supply line 5a, the second hydrogen supply line 5b, the main hydrogen supply line 12, and the third hydrogen supply line 5c (the lines in which hydrogen flows are drawn thick just like in FIGS. 3, 4, and 5).

Then, hydrogen supplied from the compressor 2 to the dispenser 4 is supplied to the FCV through the hydrogen supply hose 13. At this time, the tank of the FCV is filled with hydrogen so that the pressure of the tank increases from 68 MPa to 70 MPa, for example.

As described above, the direct filling mode in which hydrogen is introduced only from the compressor 2 can reliably fill up the tank of the FCV without preparing an expensive pressure accumulator tank having high maximum pressure value.

In this way, when the tank of the FCV becomes full in the direct filling step, the operation of filling the FCV with hydrogen ends. Thereafter, in a boost/recovery step, the boosting of the recovery/standby bank starts.

Figure 7:
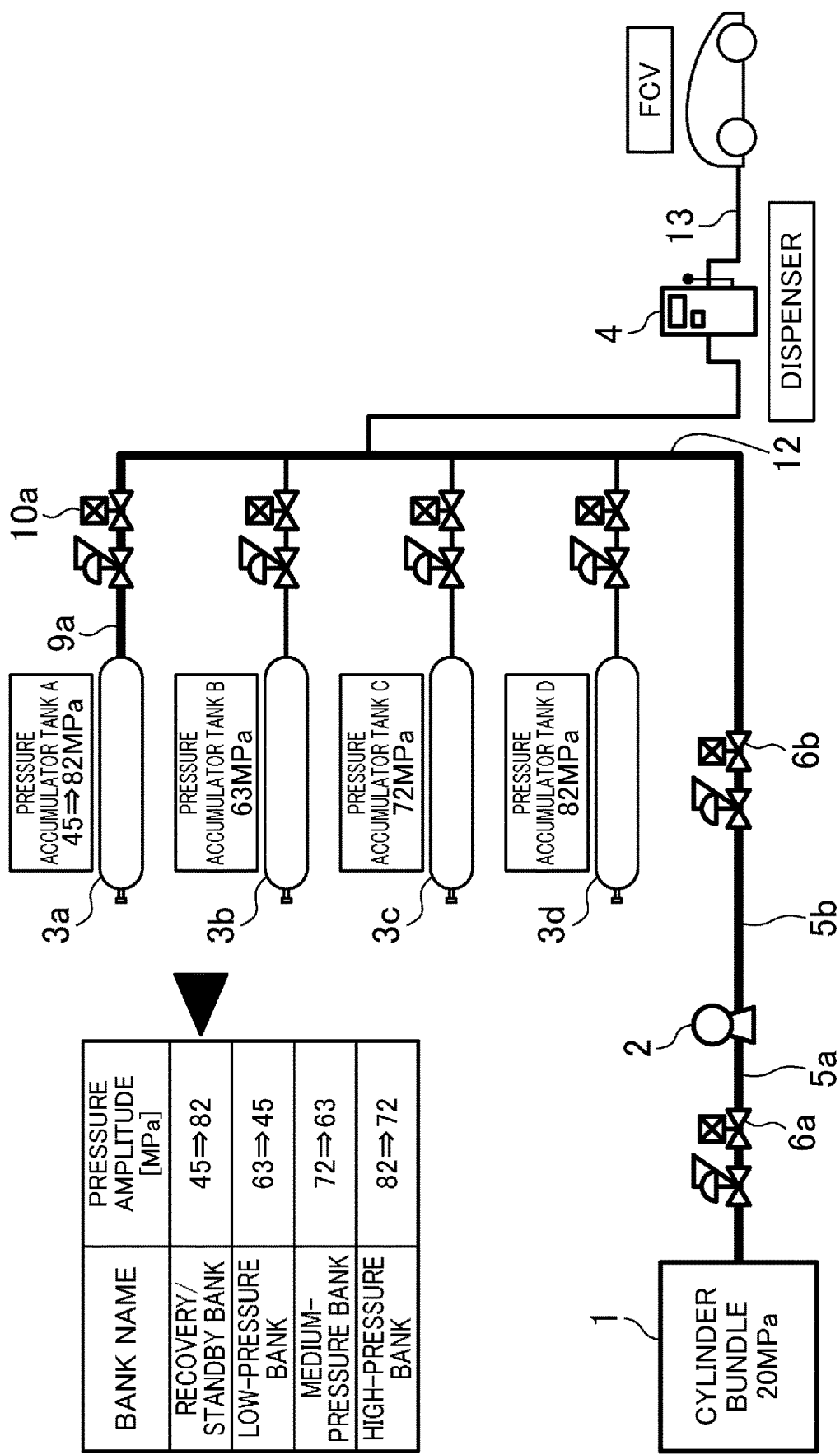
FIG. 7 is a schematic view illustrating a boost/recovery step in the bank rotation mode.

FIG. 7 is a schematic view illustrating the boost/recovery step (a step of boosting the recovery/standby bank by the compressor) in the bank rotation mode. Specifically, as shown in the upper left table, this is a step of supplying hydrogen so that the recovery/standby bank is boosted from 45 MPa to 82 MPa, for example.

In FIG. 7, unlike in FIG. 6 and other drawings, the pressure accumulator tank A has changed its function from the low-pressure bank to the recovery/standby bank. The change in function has been made because the functions of the pressure accumulator tanks have been changed in rotation after the filling of the FCV (see S15 in FIG. 2). This is a step of "boosting the recovery/standby bank."

As shown in FIG. 7, for example, when boosting the recovery/standby bank, the controller 8 (see FIG. 1) sends an open control signal to the first and second electromagnetic open/close valves 6a and 6b to open the electromagnetic open/close valves 6a and 6b, so that hydrogen boosted in the compressor 2 is supplied to the recovery/standby bank. Further, an open signal is also sent to the electromagnetic open/close valve A10a to open the electromagnetic open/close valve A10a. Before sending these signals, a close signal is sent to the dispenser 4 to close an open/close valve (not shown) to block hydrogen from flowing into the dispenser 4.

The control performed as described above causes hydrogen boosted in the compressor 2 to be supplied to the pressure accumulator tank A3a serving as the recovery/standby bank through the first hydrogen supply line 5a, the second hydrogen supply line 5b, the main hydrogen supply line 12, and the hydrogen supply line branch A9a (the lines in which hydrogen flows are drawn thick just like in the other drawings).

This allows the pressure accumulator tank A3a to be filled with high-pressure hydrogen, thereby raising the pressure dropped due to the previous hydrogen supply to the FCV to a high pressure.

Boosting the pressure accumulator tank A3a serving as the recovery/standby bank in this way can cause the pressure accumulator tank A3a to function as a high-pressure bank in the next filling of the FCV.

Through the above-described flow, a series of steps in the bank rotation mode ends.

Figure 8:
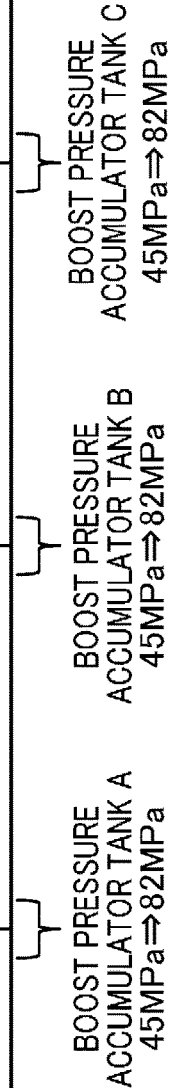
FIG. 8 is a table illustrating how the functions of banks change for each FCV in the bank rotation mode.

FIG. 8 illustrates a table indicating how the functions of the pressure accumulator tanks change for each FCV in the bank rotation mode.

In this table, a vertical axis represents the pressure accumulator tanks and the compressor which are hydrogen supply sources, and a horizontal axis represents the FCVs in the order of filling with hydrogen. In addition, numerical values shown in columns indicate changes in pressure of the pressure accumulator tanks, and numerical values in parentheses indicate changes in pressure of the tanks to be filled of the FCV in the respective steps.

First, when filling the first FCV, the pressure accumulator tank A3a functions as the low-pressure bank that performs the first filling; the pressure accumulator tank B3b functions as the medium-pressure bank that performs the second filling; the pressure accumulator tank C3c functions as the high-pressure bank that performs the third filling; and the compressor 2 functions as a direct filling unit that performs the fourth filling. Note that when filling the first FCV, the pressure accumulator tank D3d, serving as the recovery/standby bank, does not participate in the filling of the FCV.

Then, in a period between the filling of the first FCV and the filling of the second FCV, a step of supplying the compressed hydrogen to the pressure accumulator tank A3a is performed to boost the pressure accumulator tank A3a which has been the low-pressure bank. Note that this boosting is performed by the compressor 2.

Then, when filling the second FCV, the pressure accumulator tank B3b functions as the low-pressure bank that performs the first filling; the pressure accumulator tank C3c functions as the medium-pressure bank that performs the second filling; the pressure accumulator tank D3d functions as the high-pressure bank that performs the third filling; and the compressor 2 functions as a direct filling unit that performs the fourth filling. Note that when filling the second FCV, the pressure accumulator tank A3a, serving as the recovery/standby bank, does not participate in the filling of the FCV.

Then, in a period between the filling of the second FCV and the filling of the third FCV, a step of supplying the compressed hydrogen to the pressure accumulator tank B3b is performed to boost the pressure accumulator tank B3b which has been the low-pressure bank. This boosting is also performed by the compressor 2.

Then, when filling the third FCV, the pressure accumulator tank C3c functions as the low-pressure bank that performs the first filling; the pressure accumulator tank D3d functions as the medium-pressure bank that performs the second filling; the pressure accumulator tank A3a functions as the high-pressure bank that performs the third filling; and the compressor 2 functions as a direct filling unit that performs the fourth filling. Note that when filling the third FCV, the pressure accumulator tank B3b, serving as the recovery/standby bank, does not participate in the filling of the FCV.

Then, in a period between the filling of the third FCV and the filling of the fourth FCV, a step of supplying the compressed hydrogen to the pressure accumulator tank C3c is performed to boost the pressure accumulator tank C3c which has been the low-pressure bank. This boosting is also performed by the compressor 2.

Finally, when filling the fourth FCV, the pressure accumulator tank D3d functions as the low-pressure bank that performs the first filling; the pressure accumulator tank A3a functions as the medium-pressure bank that performs the second filling; the pressure accumulator tank B3b functions as the high-pressure bank that performs the third filling; and the compressor 2 functions as a direct filling unit that performs the fourth filling. Note that when filling the fourth FCV, the pressure accumulator tank C3c, serving as the recovery/standby bank, does not participate in the filling of the FCV.

Although not shown, in a period between the filling of the fourth FCV and the filling of the fifth FCV, a step of supplying the compressed hydrogen to the pressure accumulator tank D3d is performed to boost the pressure accumulator tank D3d which has been the low-pressure bank. This boosting is also performed by the compressor 2.

As described above, in the bank rotation mode, the functions of the pressure accumulator tanks 3a to 3d are sequentially changed for each FCV. This indicates that each of the pressure accumulator tanks 3a to 3d is boosted only once while filling the four FCVs. Specifically, the pressure accumulator tanks 3a to 3d change the functions in rotation for each vehicle, and the boosting is performed only once while filling the four vehicles.

Figure 9:
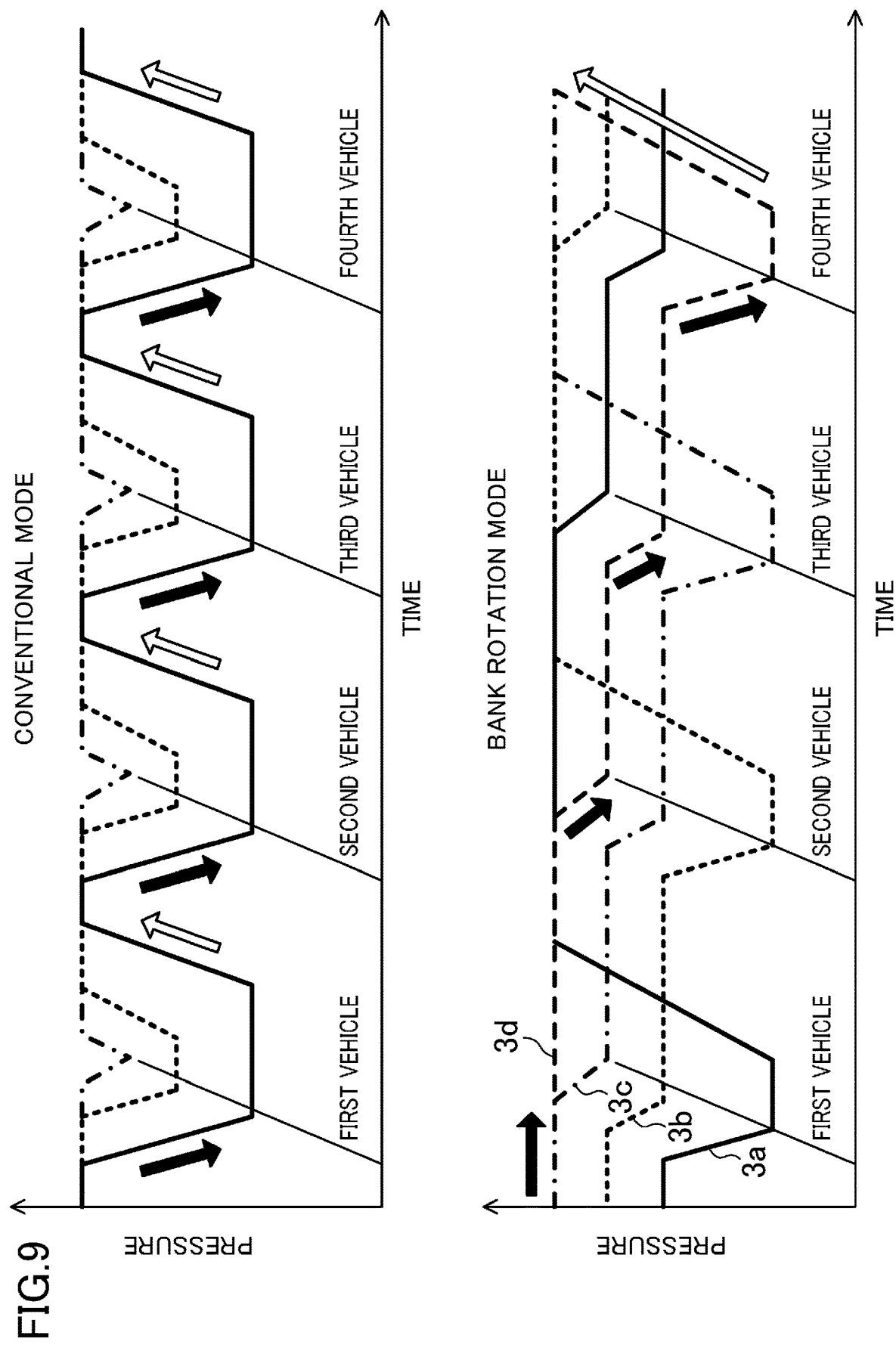
FIG. 9 is a timing diagram of pressure changes for comparison between a conventional mode and the bank rotation mode.

This will be described in more detail with reference to FIG. 9. Graphs of FIG. 9 show the pressure increase of each bank, in which the vertical axis represents the pressure value of each bank, and the horizontal axis represents time. In a graph showing a conventional mode, a solid line indicates the pressure change of the first pressure accumulator tank; a dotted line indicates that of the second pressure accumulator tank; a dash-dot line indicates that of the third pressure accumulator tank; and a thin line indicates that of the FCV. On the other hand, in the bank rotation mode, a solid line indicates the pressure change of the pressure accumulator tank A3a; a dotted line indicates that of the pressure accumulator tank B3b; a dash-dot line indicates that of the pressure accumulator tank C3c; a broken line indicates that of the pressure accumulator tank D3d; and a thin line indicates that of the tank to be filled of the FCV.

First, if three pressure accumulator tanks are used in the conventional mode, for example, all the three pressure accumulator tanks are filled up to the maximum pressure. Thus, all the pressure accumulator tanks have the maximum initial pressure values.

Then, when the filling of the first FCV starts, the filling of hydrogen from the first pressure accumulator tank starts, and continues until the pressure of the first pressure accumulator tank approximately balances with the pressure of the tank to be filled of the FCV. This is because the filling of hydrogen is performed by the "differential pressure," and cannot be performed to a higher pressure once the pressures balance with each other.

Next, the filling of hydrogen from the second pressure accumulator tank is performed. The filling from the second pressure accumulator tank also ends when the pressure of the tank to be filled of the FCV and the pressure of the pressure accumulator tank balance with each other. Finally, hydrogen is supplied from the third pressure accumulator tank, and the filling of the FCV ends when the pressure of the tank to be filled of the FCV and the pressure of the pressure accumulator tank finally balance with each other.

After the filling is completed, each of the pressure accumulator tanks is boosted in preparation for the next filling of the second FCV. Specifically, the pressure accumulator tank that performed the third filling is initially boosted; the pressure accumulator tank that performed the second filling is secondly boosted; and then the pressure accumulator tank that performed the first filling is finally boosted. In this way, all the pressure accumulator tanks are boosted up to the maximum pressure.

As described above, according to the conventional mode, all the pressure accumulator tanks are boosted every time the vehicle is filled. Thus, pressure accumulation (boosting) is required for each supply (see black arrows and white arrows), which increases the "total number of pressure accumulation cycles" related to durability. This inevitably increases the replacement frequency of the pressure accumulator tanks.

On the other hand, in the bank rotation mode employed in the present embodiment, the filling of the first FCV starts from the pressure accumulator tank A3a that initially functions as the low-pressure bank, and then the filling is performed in the order of the pressure accumulator tank B3b serving as the medium-pressure bank, and the pressure accumulator tank C3c serving as the high-pressure bank.

Of course, each of the pressure accumulator tanks 3a to 3d finishes the filling when its pressure balances with the pressure of the tank to be filled of the FCV. However, having different initial values, the pressure accumulator tanks 3a to 3d balance with the pressure of the tank to be filled of the FCV at different values (lower limit values). Therefore, if the pressure accumulation is performed in the order of the low-pressure bank, the medium-pressure bank, and the high-pressure bank, the FCV can be filled in an optimal state. In this way, the first FCV is sequentially filled with hydrogen by the plurality of pressure accumulator tanks 3a to 3d having the different functions.

When the filling of the first FCV is finished, the pressure accumulator tank A3a, which has been the low-pressure bank, switches to the recovery/standby bank in rotation (see S15), and is boosted in preparation for the next filling of the FCV. The boosting increases the pressure of the pressure accumulator tank A3a to the maximum pressure.

The pressure accumulator tanks 3a to 3d are configured to fill the second and subsequent FCVs while changing their functions in rotation.

The pressure change of the pressure accumulator tank D3d indicated by the broken line is now focused on. The pressure accumulator tank D3d shows no pressure change when during the filling of the first FCV because it functions as the recovery/standby bank (see the black arrow). Then, the pressure accumulator tank D3d functions as the high-pressure bank to perform the filling in a high pressure range when filling the second FCV (see the black arrow), functions as the medium-pressure bank to perform the filling in a medium pressure range when filling the third FCV, and functions as the low-pressure bank to perform the filling in a low pressure range when filling the fourth FCV (see the black arrow). Thereafter, only the pressure accumulator tank D3d serving as the recovery/standby bank is boosted (see the white arrow).

As can be seen, when focused on the pressure accumulator tank D3d, the pressure accumulation is performed only once during the filling of the four FCVs in this bank rotation mode. Thus, the total number of pressure accumulation cycles can be reduced. Therefore, unlike in the conventional mode, the replacement frequency of the pressure accumulator tanks can be reduced.

Specifically, in the bank rotation mode, the frequency of the pressure accumulation of the pressure accumulator tanks 3a to 3d can be reduced, and thus, the total number of the pressure accumulation cycles can be reduced. This can reduce the cost of replacement of the pressure accumulator tanks 3a to 3d, and can reduce the maintenance cost of the hydrogen station P.

However, the durability of the pressure accumulator tanks 3a to 3d is not sufficiently improved even by merely operating the hydrogen station in the bank rotation mode. Therefore, in the present embodiment, the compressor is used to assist the filling to improve the durability. This will be described in detail with reference to FIG. 10.

FIG. 10 shows graphs respectively illustrating the pressure changes in the conventional mode, the pressure changes in the bank rotation mode, and the pressure changes when the bank rotation mode of the present embodiment is combined with an assist mode. Just like in FIG. 9, the vertical axis represents the pressure value, and the horizontal axis represents time.

As shown in the graphs, when the FCV is filled with hydrogen in the conventional mode, a large pressure change occurs in the first pressure accumulator tank, i.e., a pressure drop occurs steeply from the maximum pressure to the minimum pressure, and then a pressure rise occurs steeply from the minimum pressure to the maximum pressure by boosting the pressure. A pressure fluctuation width PW1 of the pressure accumulator tank is, for example, in a range of 82 Mpa to 60 MPa.

Since the filling is performed by the differential pressure, the minimum pressure value (60 Mpa) at this time is determined by the pressure value of the pressure accumulator tank at the start of the filling. However, in the conventional mode, the pressure is maintained at a relatively high pressure (60 MPa) because the initial pressure is the maximum pressure (82 Mpa).

In contrast, in the bank rotation mode, the pressure of the pressure accumulator tank serving as the low-pressure bank at the end of the filling is the minimum pressure value. Thus, a pressure fluctuation width PW2 of the pressure accumulator tank is, for example, in a range of 82 MPa to 40 MPa.

This is because the pressure value of the pressure accumulator tank serving as the low-pressure bank at the start of filling is lower than that in the conventional mode (e.g., the former is 63 MPa, while the latter is 82 Mpa), and therefore, the minimum pressure value (40 MPa) becomes inevitably low, making the pressure fluctuation width PW2 of the pressure accumulator tank large.

However, the increase in the pressure fluctuation width greatly fluctuates a load on the pressure accumulator tank, which applies a large load on the pressure accumulator tank itself. This may result in poor durability of the pressure accumulator tank even if the total number of pressure accumulation cycles could be reduced. In other words, the number of repetitions in the so-called S-N diagram of the pressure accumulator tank may be reduced.

Therefore, in the present embodiment, a combination of the bank rotation mode and an assist mode is employed to solve this problem. Specifically, when the pressure accumulator tank 3 serving as the low-pressure bank fills the FCV, the compressor 2 simultaneously supplies hydrogen, so that the minimum pressure value (40 MPa) determined by the differential pressure filling is raised.

In short, when hydrogen is supplied not only from any of the pressure accumulator tanks 3a to 3d serving as the low-pressure bank, but also from the compressor 2, the tank of the FCV is filled with a larger amount of hydrogen, so that the pressure value to be balanced in the filling by the differential pressure is raised to increase the minimum pressure value.

Specifically, the minimum pressure value can be set to, for example, about 45 MPa, and thus, a pressure fluctuation width PW3 of the pressure accumulator tanks 3a to 3d is, for example, in a range of 82 Mpa to 45 MPa. This value is larger than that in the conventional mode, but can be smaller than that in the normal bank rotation mode because the minimum pressure value has raised.

In this way, according to the present embodiment, even if the pressure fluctuation width of the pressure accumulator tank becomes relatively large in the bank rotation mode, the minimum pressure value of the pressure accumulator tank 3 serving as the low-pressure bank can be raised by supplying hydrogen compressed in the compressor 2 (by assisting the hydrogen supply). This can reduce the pressure variation width PW3.

For this reason, even in the bank rotation mode, the compressor 2 supplies hydrogen to assist the hydrogen supply so that the pressure fluctuation width is reduced and the load imposed on the pressure accumulator tanks 3a to 3d is reduced. This can improve the durability of the pressure accumulator tanks 3a to 3d by taking advantage of the reduced total number of the pressure accumulation cycles in the bank rotation mode.

Therefore, regarding the hydrogen station P operated in the bank rotation mode and the method for operating the hydrogen station P, the present embodiment makes it possible to reliably achieve the goal of keeping the pressure value (minimum pressure value) of the pressure accumulator tanks 3a to 3d serving as the low-pressure bank at the end of the filling from decreasing as much as possible, thereby reducing the replacement frequency of the pressure accumulator tanks 3a to 3d.

Further, in the present embodiment, control is made to additionally supply hydrogen only from the compressor 2 to the FCV (direct filling) after the filling from each of the pressure accumulator tanks 3a to 3d in the bank rotation mode.

According to this configuration, hydrogen is supplied from the compressor even after the end of the hydrogen supply from each of the pressure accumulator tanks 3a to 3d. Thus, hydrogen can be supplied to the FCV at a high pressure without greatly increasing the maximum pressure value of the pressure accumulator tanks 3a to 3d.

Therefore, it is not necessary to increase the maximum pressure values of the pressure accumulator tanks 3a to 3d, and the pressure fluctuation width (pressure amplitude) of the pressure accumulator tanks 3a to 3d can be reduced.

The reduction in the pressure fluctuation width (pressure amplitude) of the pressure accumulator tanks 3a to 3d can further reduce the burden on the pressure accumulator tanks 3a to 3d, thereby improving the durability of the pressure accumulator tanks 3a to 3d.

Since the maximum pressure values of the pressure accumulator tanks 3a to 3d do not have to be high, the unit price of the pressure accumulator tanks 3a to 3d can also be relatively lowered. This can reduce the cost of equipment management even if the pressure accumulator tanks 3a to 3d need to be replaced.

Further, in the present embodiment, the single compressor 2 is configured to have the function of boosting the pressure accumulator tanks 3a to 3d and the function of assisting the hydrogen supply from the pressure accumulator tanks 3a to 3d (the operation of filling the FCV).

This configuration allows the single compressor to boost the pressure accumulator tanks 3a to 3d, and to assist the filling of the FCV. Thus, the equipment cost can be made lower than the cost required when the boosting function and the assisting function are separately prepared.

Therefore, the present embodiment makes it possible to further reduce the cost required for installing and maintaining the hydrogen station P.

Other Embodiments

Other embodiments will be described below.

The number of pressure accumulator tanks may not always be four, and may be three. In this case, for example, the pressure accumulator tanks may function as a low-pressure bank, a high-pressure bank, and a recovery/standby bank in rotation. Alternatively, the number of pressure accumulator tanks may be five. In this case, the pressure accumulator tanks may function as, for example, a low-pressure bank, a mid-low-pressure bank, a mid-high-pressure bank, a high-pressure bank, and a recovery/standby bank in rotation. Further, the number of pressure accumulator tanks may be increased to six, seven or more.

Further, the compressor 2 may include separate compressors, namely, a compressor that performs the assist control, and a compressor that boosts the pressure accumulator tanks. If the compressor includes the separate compressors as described above, there is no need to stop the boosting of the pressure accumulator tank even if the FCV needs to be filled during the boosting of the pressure accumulator tank. In addition, if the compressor that performs the assist control and the compressor that boosts the pressure accumulator tanks are separately provided, the compressors can be used depending on their compression pressures and operation conditions. This can further improve the performance of the hydrogen station.

Although the hydrogen station operated in the bank rotation mode has been described in the first embodiment, the bank rotation mode may be configured as one of operation modes of the hydrogen station.

Other alterations or additions may be made to the configuration without departing from the spirit of the invention.

INDUSTRIAL APPLICABILITY

As can be seen in the foregoing, the hydrogen station of the present invention and the method for operating the hydrogen station are useful for, for example, a hydrogen station which includes a plurality of pressure accumulator tanks and is operated in an operation mode called a bank rotation mode, and a method for operating the hydrogen station.

DESCRIPTION OF REFERENCE CHARACTERS

T Hydrogen Station
2 Compressor
3 Pressure Accumulator Tank
3a Pressure Accumulator Tank A
3b Pressure Accumulator Tank B
3c Pressure Accumulator Tank C
3d Pressure Accumulator Tank D
4 Dispenser

The invention claimed is:
1. A hydrogen station, comprising:
a booster unit that boosts hydrogen;
a pressure accumulator unit that accumulates the hydrogen boosted by the booster unit; and
a supply unit that supplies the hydrogen accumulated in the pressure accumulator unit to a target to be filled, wherein:
the pressure accumulator unit includes at least three pressure accumulator tanks including:
a first accumulator tank configured to accumulate the hydrogen in a first accumulation pressure range;
a second accumulator tank configured to accumulate the hydrogen in a second accumulation pressure range lower than the first accumulation pressure range; and
a third accumulator tank configured to accumulate the hydrogen in a third accumulation pressure range lower than the second accumulation pressure range,
the hydrogen station further comprises a pressure accumulator unit controller that performs control such that:
when supplying the hydrogen from the supply unit to a first target to be filled, the second pressure accumulator tank initially supplies the hydrogen in the second accumulation pressure range; the first pressure accumulator tank secondly supplies the hydrogen in the first accumulation pressure range when the second pressure accumulator tank reaches the third pressure accumulation pressure range, and continues supplying the hydrogen until the first pressure accumulator tank reaches the second accumulation pressure range; and the third pressure accumulator tank accumulates the hydrogen boosted by the booster unit to the first accumulation pressure range; and
when supplying the hydrogen from the supply unit to a next target to be filled, the first pressure accumulator tank initially supplies the hydrogen in the second accumulation pressure range; the third pressure accumulator tank secondly supplies the hydrogen in the first accumulation pressure range when the first pressure accumulator tank reaches the third pressure accumulation pressure range, and continues supplying the hydrogen until the third pressure accumulator tank reaches the second accumulation pressure range; and the second pressure accumulator tank accumulates the hydrogen boosted by the booster unit to the first accumulation pressure range, and the hydrogen station further comprises:
- a hydrogen supply line for supplying the hydrogen from a compressor unit directly to the supply unit; and
- an assist controller that performs control such that the compressor unit configured to compress hydrogen supplies the hydrogen using the hydrogen supply line simultaneously while the pressure accumulator unit supplies the hydrogen to the supply unit.

2. The hydrogen station of claim 1, wherein:
the assist controller performs control such that the compressor unit supplies the hydrogen to the supply unit even after the pressure accumulator unit has finished supplying the hydrogen to the supply unit.

3. The hydrogen station of claim 1, wherein:
the compressor unit also serves as the booster unit that boosts the hydrogen.

4. A method for operating a hydrogen station that includes:
- a booster unit that boosts hydrogen;
- a pressure accumulator unit that accumulates the hydrogen boosted by the booster unit; and
- a supply unit that supplies the hydrogen accumulated in the pressure accumulator unit to a target to be filled,
- the pressure accumulator unit including at least three pressure accumulator tanks including:
  - a first accumulator tank configured to accumulate the hydrogen in a first accumulation pressure range;
  - a second accumulator tank configured to accumulate the hydrogen in a second accumulation pressure range lower than the first accumulation pressure range; and
  - a third accumulator tank configured to accumulate the hydrogen in a third accumulation pressure range lower than the second accumulation pressure range, the method comprising:

a first supply of hydrogen of supplying the hydrogen from the supply unit to a first target to be filled, wherein the second pressure accumulator tank initially supplies the hydrogen in the second accumulation pressure range, the first pressure accumulator tank secondly supplies the hydrogen in the first accumulation pressure range when the second pressure accumulator tank reaches the third pressure accumulation pressure range, and continues supplying the hydrogen until the first pressure accumulator tank reaches the second accumulation pressure range, and the third pressure accumulator tank accumulates the hydrogen boosted by the booster unit to the first accumulation pressure range; and a second supply of hydrogen of supplying the hydrogen from the supply unit to a next target to be filled, wherein the first pressure accumulator tank initially supplies the hydrogen in the second accumulation pressure range, the third pressure accumulator tank secondly supplies the hydrogen in the first accumulation pressure range when the first pressure accumulator tank reaches the third pressure accumulation pressure range, and continues supplying the hydrogen until the third pressure accumulator tank reaches the second accumulation pressure range, and the second pressure accumulator tank accumulates the hydrogen boosted by the booster unit to the first accumulation pressure range, wherein:

in the first supply of hydrogen and the second supply of hydrogen, a compressor unit that compresses hydrogen supplies the hydrogen to the supply unit using a hydrogen supply line for supplying the hydrogen from the compressor unit directly to the supply unit simultaneously while the pressure accumulator unit supplies the hydrogen to the supply unit.

5. The method of claim 4, wherein:
the compressor unit supplies the hydrogen to the supply unit even after the pressure accumulator unit has finished supplying the hydrogen to the supply unit.

6. The method of claim 5, wherein:
the compressor unit also serves as the booster unit and supplies the hydrogen to the supply unit.

7. The method of claim 4, wherein:
the compressor unit also serves as the booster unit and supplies the hydrogen to the supply unit.

8. The hydrogen station of claim 2, wherein:
the compressor unit also serves as the booster unit that boosts the hydrogen.

* * * * *